(12) United States Patent
Tobiason et al.

(10) Patent No.: US 7,502,122 B2
(45) Date of Patent: Mar. 10, 2009

(54) FIBER-OPTIC MINIATURE ENCODER FOR FINE PITCH SCALES

(75) Inventors: Joseph D. Tobiason, Woodinville, WA (US); Eric Herbert Altendorf, Everett, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 80 days.

(21) Appl. No.: 11/461,423

(22) Filed: Jul. 31, 2006

(65) Prior Publication Data

US 2008/0024789 A1  Jan. 31, 2008

(51) Int. Cl.
G01B 9/02 (2006.01)

(52) U.S. Cl. ...................................... 356/499

(58) Field of Classification Search ............ 250/231.16; 356/521, 499, 498
See application file for complete search history.

(56) References Cited

U.S. PATENT DOCUMENTS

| | | | |
|---|---|---|---|
| 4,291,976 A | 9/1981 | McMahon | |
| 4,426,130 A | 1/1984 | Knop | |
| 4,733,071 A | 3/1988 | Tokunaga | |
| 5,229,830 A * | 7/1993 | Ishida et al. | 356/28.5 |
| 5,424,833 A | 6/1995 | Huber et al. | |
| 5,815,267 A * | 9/1998 | Kato et al. | 356/486 |
| 5,909,283 A | 6/1999 | Eselun | |
| 6,771,377 B2 | 8/2004 | Jones et al. | |
| 6,906,315 B2 | 6/2005 | Tobiason | |
| 6,906,316 B2 * | 6/2005 | Sugiyama et al. | 250/239 |
| 7,046,368 B2 * | 5/2006 | Holzapfel et al. | 356/488 |
| 7,053,362 B2 * | 5/2006 | Tobiason et al. | 250/231.16 |
| 7,091,475 B2 * | 8/2006 | Tobiason | 250/231.16 |
| 7,126,696 B2 * | 10/2006 | Tobiason | 356/499 |
| 2005/0068539 A1 | 3/2005 | Tobiason | |

FOREIGN PATENT DOCUMENTS

| | | |
|---|---|---|
| EP | 1347271 A1 | 9/2003 |
| EP | 1521060 A2 | 4/2005 |
| JP | 06050718 | 2/1994 |

OTHER PUBLICATIONS

European Search Report dated Jan. 4, 2008, issued in corresponding European Application No. 07112379.8, filed Jul. 12, 2007.

* cited by examiner

*Primary Examiner*—Hwa S Lee (Andrew)
(74) *Attorney, Agent, or Firm*—Christensen O'Connor Johnson Kindness PLLC

(57) ABSTRACT

An ultra-miniature interferometric fiber-optic encoder readhead for sensing displacement of a very fine pitch scale grating is disclosed. The readhead includes a source grating that diffracts diverging source light into +/− 1st order beams, a pair of mirrors that reflect the +/− 1st order beams to converge toward the scale grating. The +/− 1st order scale light beams are reflectively diffracted back from scale grating to return to the mirrors, and are then reflected to converge back toward the light source and a set of adjacent fiber-optic receiver channels. An interference field generating grating positioned in front of the receiver channels produces interference fringes having a desired pitch. Movement of the interference fringes is sensed by the fiber-optic receiver channels to provide displacement information. The readhead may be configured so that primarily or only +/− $1^{st}$ order light reaches the receiver channels.

13 Claims, 11 Drawing Sheets

FIBER-OPTIC MINIATURE ENCODER FOR FINE PITCH SCALES

FIELD OF THE INVENTION

This invention relates generally to displacement sensing optical encoders, and more particularly to an optical encoder utilizing optical fibers as receiver elements to provide an ultra-compact high accuracy system.

BACKGROUND

Various optical encoders for sensing linear, rotary or angular movement are currently available. One recent system that is compact and utilizes fewer parts than most previous systems is disclosed in U.S. Pat. No. 5,909,283, to Eselun. However, the resulting encoder is still of a size that is relatively large or prohibitive for a number of applications. A very compact system utilizing optical fibers as receivers is disclosed in U.S. Pat. No. 4,733,071, to Tokunaga. The system described in the '071 patent has a code member scale, and an optical sensor head comprising an optical fiber tip light emitter and two optical fiber tip receptors closely arranged along the code member measuring axis. The optical sensor head is rotated (yawed) to adjust the phase difference between the two optical fiber tip receptors. However, the accuracy of the resulting encoder is relatively crude. Another optical encoder utilizing optical fibers as receivers is disclosed in U.S. Pat. No. 4,291,976 to McMahon. The system described in the '976 patent includes optical fibers with striped ends that are positioned opposite relatively movable coded channel patterns, permitting the detection of motions that are comparable to the stripe width rather than the fiber diameter. However, the accuracy and resolution of the resulting encoder is still relatively crude compared to that provided by an interferometric-type encoder, and compared to that needed for a number of applications. In various applications, it is desirable to use a so-called interferometric-type optical encoder, in order to achieve high resolution and accuracy. However, known interferometric-type optical encoders are not sufficiently compact for a number of applications, or they employ electronic detectors that limit the possible output frequency and motion speeds, or both.

SUMMARY

The present invention is directed to providing an encoder that overcomes the foregoing and other disadvantages. More specifically, the present invention is directed to an interferometric optical encoder that is of extremely small size while providing very high resolution and accuracy, the ability to sense the displacement of a scale grating having a very fine pitch, and a number of other desirable features.

Compared to known crude fiber-optic encoders, this interferometric-type encoder can operate with a relatively smaller scale pitch, in order to conveniently provide finer measurement resolution. Compared to known interferometric-type encoders, this encoder provides an unprecedented combination of size, resolution and/or accuracy, economical fabrication, and the ability to operate with very fine scale grating pitches.

The readhead includes a light source for transmitting light to the scale grating and detector channels for receiving light reflected from the scale grating. In accordance with one aspect of the invention, the various light beams provided in the readhead include diverging rays of light, within each beam. In accordance with one aspect of the invention, the detector channels of the encoder readhead are fiber-optic detector channels. The readhead further includes a source grating that diffracts and splits the source light into at least +/− 1 st order source light beams, and a pair of mirrors that are arranged to receive and reflect the +/− 1 st order source light beams to converge toward the scale grating and that further receive and reflect +/− 1 st order scale light beams diffracted by the scale grating such that they converge back toward the light source and the fiber-optic detector channels. The readhead still further includes an interference field generating grating that receives and diffracts the converging +/− 1st order scale light beams, to produce an interference illumination field having a desired fringe pitch. Movement of the fringes in the interference illumination field corresponds to relative displacement between the scale and the readhead and is sensed by the fiber-optic detector channels to provide displacement measurement information.

In accordance with one aspect of the invention, in some embodiments, the light beams that reach the scale grating may be substantially s-polarized at the scale grating. (S-polarized light in this case is defined to have a maximum electric field component oriented parallel to the measurement axis, that is, perpendicular to the direction of the individual scale grating grooves or bars.) Such a configuration may be particularly advantageous when the scale grating pitch is as small as 1.5 microns, or 1.0 micron, or less. In accordance with another aspect of the invention, in some embodiments, the source light may be provided by a polarizing or polarization-maintaining optical fiber, and the source light may be polarized such that the light beams that reach the scale grating are substantially s-polarized.

In accordance with another aspect of the invention, in various embodiments, the majority or all of the optical path(s) from the source grating, to the pair of mirrors, to the scale grating, back to the mirrors and back to the interference field generating grating may be in air. This configuration may be advantageous when the scale grating pitch is approximately 1 micron, or 2 microns, or more, for example.

In accordance with another aspect of the invention, in various embodiments, the source grating, the pair of mirrors, and the interference field generating grating may be formed as part of an optical block including an incident surface and an exit surface through which the source light enters and exits. This configuration may be advantageous when the scale grating pitch is approximately 2 microns, 1 micron, or less, for example. In some embodiments, the source grating and the interference field generating grating may be coplanarly provided on, or proximate to, the incident surface of the optical block.

In accordance with another aspect of the invention, the fiber-optic encoder readhead detects the location of interference fringes arising from a scale grating using multiple fiber-optic detector channels having respective phase grating masks.

In accordance with another aspect of the invention, the fiber-optic encoder readhead utilizes an interferometric arrangement. In one embodiment, the scale grating is designed to suppress the $0^{th}$ and all even orders of diffraction from the grating. When used with very fine pitch scales (e.g., less than 0.6 microns, and especially approximately 0.5 microns or less), $3^{rd}$ and higher orders of diffraction from the scale grating may be evanescent or may follow a path that does not allow the $3^{rd}$ order light to reach the receiver channels of the readhead. The combination of the scale grating and the fiber-optic readhead produces a high-resolution interferometric-type encoder that detects displacement by sensing interference fringes arising from the plus and minus 1st orders of diffraction. In accordance with another aspect of the invention, the source grating may be designed to suppress the $0^{th}$ and all even orders of diffraction. In accordance with another aspect of the invention, the readhead may include a feature which blocks and/or absorbs any residual zero-order light that may be transmitted by the source grating.

In accordance with a further aspect of the invention, a fiber-optic interferometric-type encoder for very fine pitch scales is provided with an ultra-compact size that is unprecedented.

In accordance with another aspect of the invention, the fiber-optic encoder readhead may be constructed such that the receiver channel apertures that provide signals that are processed together to determine displacement values are approximately aligned along the measuring axis. In various embodiments, they may be aligned within a region having a dimension along a direction perpendicular to the measuring axis direction that is at most 1.0 millimeters, 0.75 millimeters, 0.5 millimeters, 0.1 millimeters, or even less. In various embodiments, the receiver channel apertures that provide signals that are processed together to determine displacement values may be positioned within a dimension that is at most 1.5 millimeters, 1.0 millimeters, or even less, along the measuring axis direction.

In accordance with a separate aspect of the invention, the fiber-optic detector channels may be arranged in complementary pairs, so that certain common mode errors may be suppressed. In accordance with a further aspect of the invention, three complementary pairs of fiber-optic detector channels may be signal processed in a manner that suppresses common mode errors and provides enhanced accuracy.

In accordance with another aspect of the invention, at least two respective sets of three fiber-optic detector channels may be signal processed independently to determine respective displacement measurements. Then, the respective displacement measurements may be averaged to determine a displacement measurement that may compensate for certain errors that may be present in the respective displacement measurements.

In accordance with a further aspect of the invention, at least two respective sets of four fiber-optic detector channels may be signal processed independently to determine respective displacement measurements. The respective displacement measurements may be averaged to determine a displacement measurement that may compensate for certain errors that may be present in the respective displacement measurements.

In accordance with a separate aspect of the invention, the light source may be provided by an optical fiber, to provide an all-optical readhead, free of all limitations and costs associated with electronic assembly and electronic signals within an encoder readhead.

In accordance with a separate aspect of the invention, various embodiments of the fiber-optic encoder readhead are constructed in a particularly economical, accurate and compact manner.

In accordance with a separate aspect of the invention, a light deflecting element may be provided to deflect the readhead light path between the fiber-optic readhead and the scale grating, such that the operable mounting orientation of the readhead relative to the scale is changed.

In accordance with a separate aspect of the invention, in one embodiment a remote interface box may be utilized that contains appropriate electronic light sources and photodetectors that interface with the fiber optics to and from one or more fiber-optic readheads according to this invention, and converts received optical signals to a form suitable for further signal processing and readhead position determination.

Hence, the invention overcomes the disadvantages of prior art optical displacement sensing devices and provides new application possibilities with an ultra-compact, highly accurate, economical and high speed configuration.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
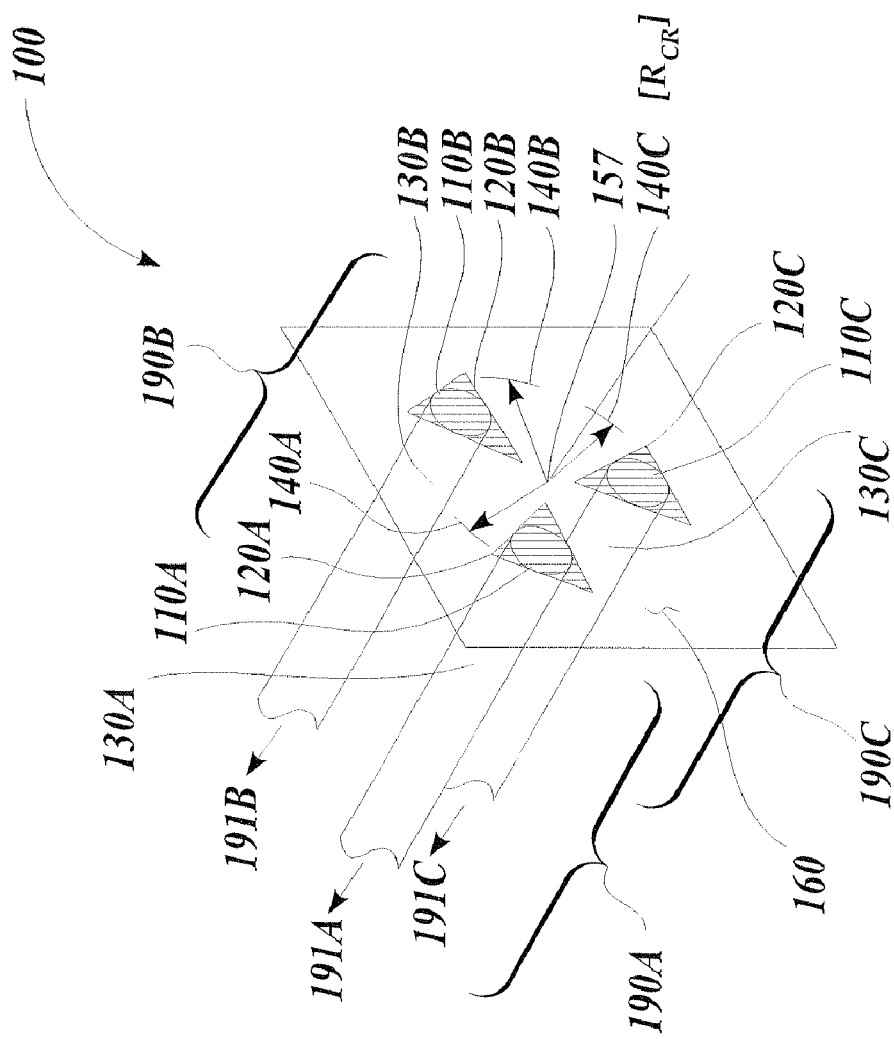
FIG. 1 is an isometric view of a first generic embodiment of a fiber-optic receiver channel arrangement according to this invention.

FIG. 1 shows a first generic embodiment of a fiber-optic receiver channel arrangement 100 usable according to this invention. As shown in FIG. 1, the fiber-optic receiver channel arrangement 100 includes three fiber-optic receiver channels 190A, 190B and 190C. The fiber-optic receiver channel 190A includes a receiver channel aperture 110A, a phase mask 120A, and a receiver optical fiber 130A. Similarly, the fiber-optic receiver channel 190B includes a receiver channel aperture 110B, a phase mask 120B, and a receiver optical fiber 130. Similarly, the fiber-optic receiver channel 190C includes a receiver channel aperture 110C, a phase mask 120C, and a receiver optical fiber 130C. Some details of a fiber-optic receiver channel arrangement of the type shown in FIG. 1 are described in co-assigned U.S. Patent Application Publication No. U.S. 2005/0068539 A1, the content of which is incorporated by reference herein. Additional understanding of various fiber optic readhead features and design principles may also be found in U.S. Pat. No. 6,906,315, (the '315 patent) the content of which is incorporated by reference herein.

For each fiber-optic receiver channel 190, the spatial phase mask 120 includes a grating that completely covers the receiver channel aperture 110, acting as a spatial filter for incoming illumination, which is then channeled down the optical fiber 130 to provide an optical signal 191. In various exemplary embodiments, the receiver channel aperture 110 is simply a flat end or a shaped end of the receiver optical fiber 130. In various other exemplary embodiments, the receiver channel aperture 110 is a compact refractive or diffractive lens, which gathers the incoming illumination through the phase mask 120, concentrates the light, and directs the light to the end of the receiver optical fiber 130. The receiver channel aperture 110, the phase mask 120 and the end of the receiver optical fiber 130 of each fiber-optic receiver channel 190 are fastened in a fixed relationship to each other by adhesives or other suitable methods.

In various exemplary embodiments according to this invention, the phase masks 120 are arranged in a coplanar arrangement that defines and/or coincides with a nominal receiving plane 160. The location of the receiver channel apertures 110 is conveniently described with reference to a channel arrangement center 157 of the fiber-optic receiver channel arrangement 100. In various high accuracy optical fiber readhead embodiments according to this invention, the channel arrangement center 157 is positioned to coincide with the nominal center of any interference illumination field presented to the fiber-optic receiver channel arrangement 100, as described further below. Each respective receiver channel aperture 110A-110C is located within a receiver aperture bounding radius 140A-140C from the channel arrangement center 157, as shown in FIG. 1. The receiver aperture bounding radius is generically indicated as $R_{CR}$ herein.

The fiber-optic receiver channels 190 are generally arranged in a fixed relationship to each other. In particular, the gratings of the phase masks 120 are nominally coplanar and are fixed in a particular spatial phase relationship with respect to one another in the receiving plane 160, e.g., by fabricating them on a single mask substrate. Exemplary assembly pieces and methods are discussed in detail further below.

Figure 2:
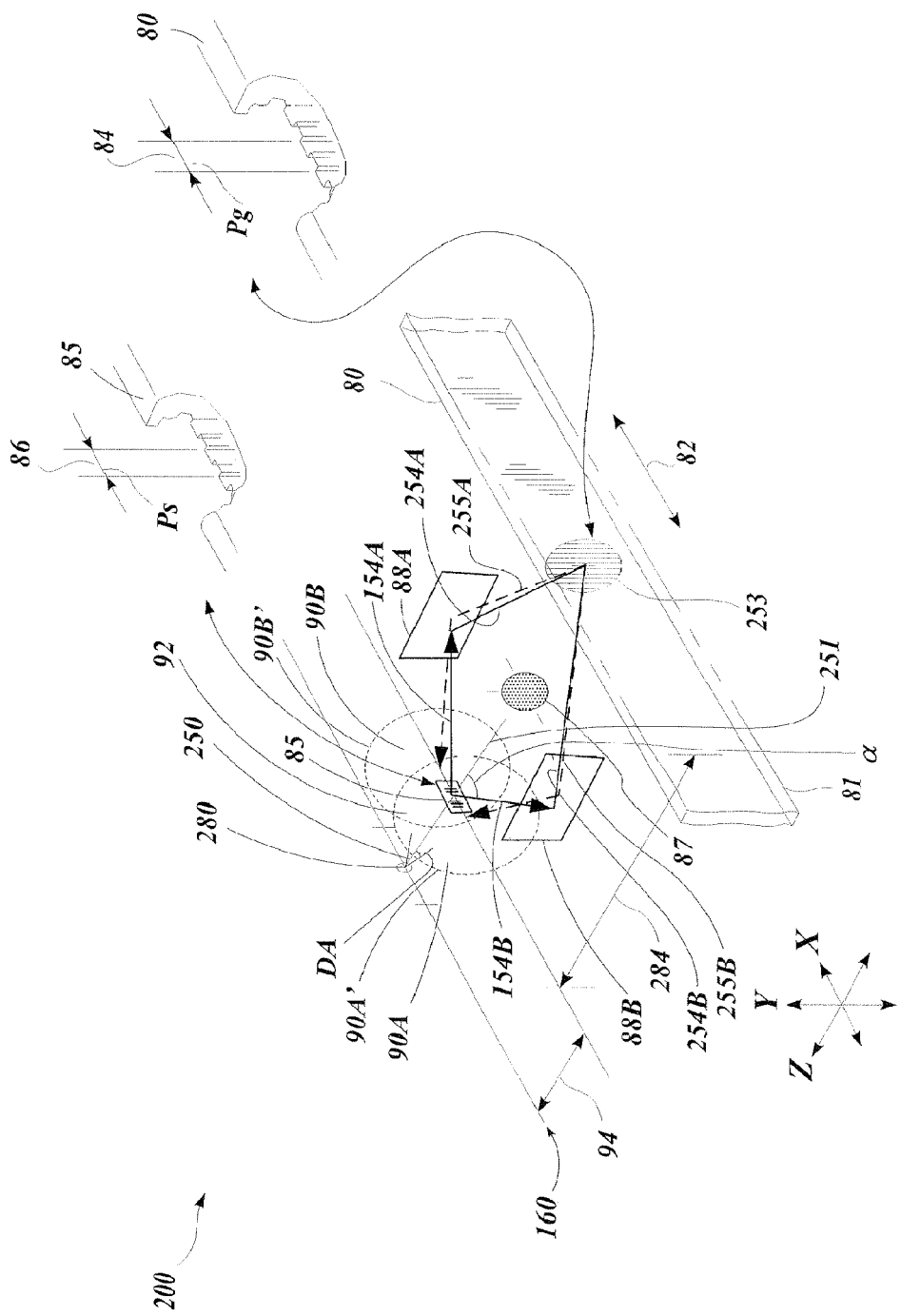
FIG. 2 is an isometric view of certain elements of a first generic embodiment of an interferometric arrangement usable in various exemplary fiber-optic readheads according to this invention.
Figure 3:
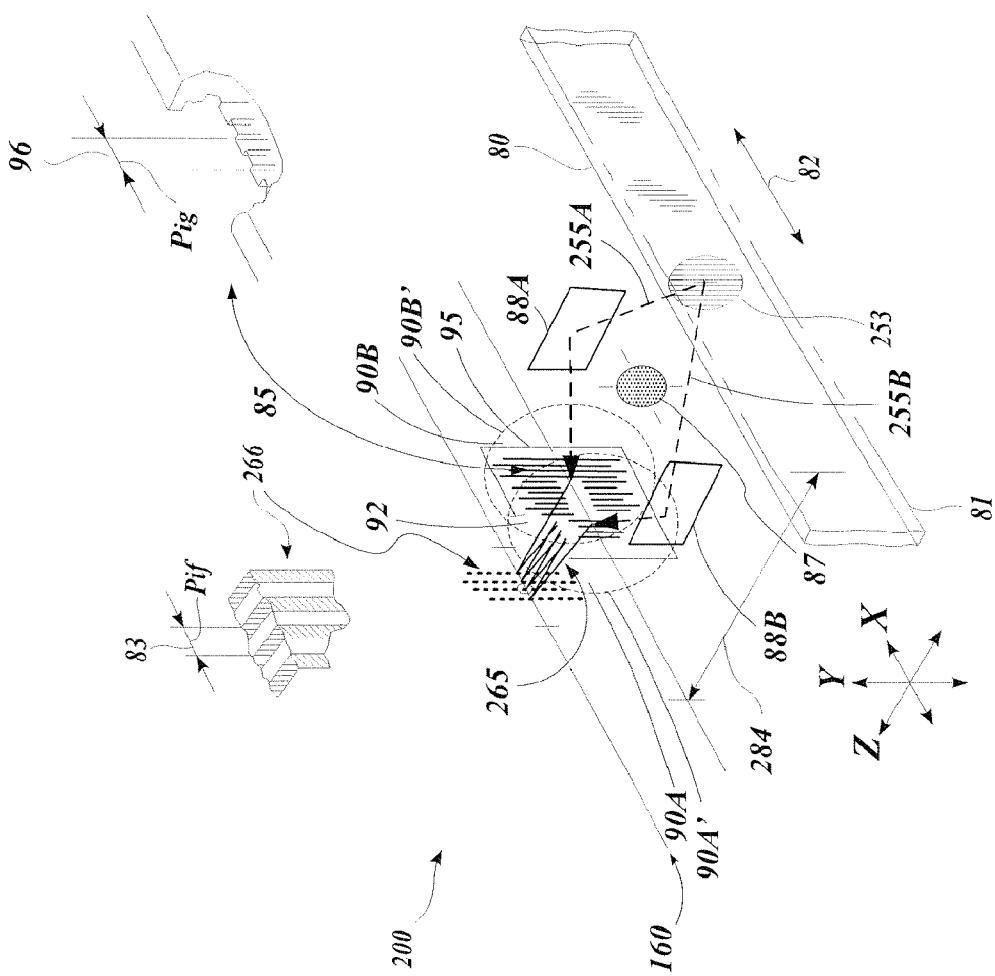
FIG. 3 is an isometric view of certain additional elements of the first generic interferometric arrangement of FIG. 2, particularly illustrating an interference fringe field produced by the interferometric arrangement.

FIGS. 2 and 3 complement each other, each showing certain elements of a first generic embodiment of an interferometric readhead arrangement 200 usable in various fiber-optic readheads according to this invention. Various features may have exaggerated dimensions in FIGS. 2 and 3, so that they may be seen more clearly. The basic principle by which interferometric encoders provide moving fringes that are indicative of displacement is well known and is not described in detail herein. The elements of the interferometric readhead arrangement 200 shown in FIG. 2 include a light source 280, a source grating 85, a pair of side mirrors 88A and 88B, and a scale grating 80. The light source 280 and the source grating 85 may be separated by a divergence gap 94. One purpose for providing a divergence gap 94 may be to insure that the grooves of the source grating 85 are "filled" with air, and not some material with a higher index of refraction. If the grooves are filled, it may be expensive or impractical to fabricate a source grating that provides the desired diffraction angles. Another purpose may be to insure that the source light diverges to span enough periods of the source grating 85, such that the source grating 85 operates in the desired manner.

The source grating 85 and the scale grating 80 are separated by a grating-to-grating gap 284, which, in some embodiments, may include various transparent materials as described further below. In other embodiments, the majority or all of the optical path(s) from the source grating 85 to the pair of mirrors 88A and 88B, to the scale grating 80, back to the mirrors and back to an interference field generating grating 95 (described below), may be in air. A configuration wherein the optical paths are in air may be advantageous for providing appropriate beam path angles in a compact readhead design when the scale grating pitch is approximately 1 micron, or 2 microns, or more, for example.

The scale grating 80 is aligned along a measuring axis 82 and may be a phase grating that includes grating elements extending perpendicular to the measuring axis 82, as indicated by vertical lines in an illumination spot 253. The grating elements are arranged periodically along the measuring axis 82 according to a grating period 84 generally indicated herein as the grating period or grating pitch $P_g$. The scale grating 80 is discussed in greater detail with reference to FIG. 4, below. The source grating 85 is aligned generally parallel to the scale grating 80 and may be a phase grating that includes grating elements arranged periodically along the direction of the measuring axis 82 according to a source grating period or pitch 86, or $P_s$. In some embodiments, the source grating is designed to suppress the $0^{th}$ and all even orders of diffraction, as described further below. If the source grating 80 does not sufficiently suppress zero-order transmitted light, the readhead arrangement 200 may include a zero-order blocking element 87, which blocks and/or absorbs that residual zero-order light.

The X, Y, and Z axes shown in FIG. 2 may be defined with reference to the plane of the scale grating 80. The X axis is parallel to the plane of the scale grating 80 and to the measuring axis 82. The X-Y plane is parallel to the plane of the scale grating 80 and the Z axis is perpendicular to that plane.

In the generic interferometric readhead arrangement 200, the light source 280 emits a source light 250 generally along a source light axis 251. The source light is generally monochromatic or quasi-monochromatic and has a nominal wavelength λ. The rays within the source light 250 generally diverge from one another, and the sine of the divergence half angle DA is commonly referred to as the numerical aperture NA of the light source. In general, the various light beams provided in the readhead arrangement 200 each include diverging rays of light, within each beam. The source grating 85 diffracts and splits the received source light into at least +/− 1st order source light beams 154A and 154B. Each of the split +/− 1st order source light beams 154A 154B follows a nominal path that forms a half-angle α with respect to the source light axis 251. The source light beams 154A and 154B are then reflected by the side mirrors 88A and 88B, to converge toward the scale grating 80 as beams 254A and 254B, respectively, which illuminate the scale grating 80 at illumination spots 253. In some embodiments, the illumination spots may fully overlap or coincide. In other embodiments they may partially overlap or coincide. In other embodiments, the two illumination spots 253 formed by the beams may be separated along the x axis.

In some embodiments, the light beams 254A and 254B that reach the scale grating are advantageously made to be substantially s-polarized at the scale grating. S-polarized light in this case is defined to have a maximum electric field component oriented parallel to the measurement axis, that is, perpendicular to the direction of the individual scale grating grooves or bars. Such a configuration may be particularly advantageous when the scale grating pitch is as small as 1.5 microns, or 1.0 micron, or less, in order to provide good diffraction efficiency. In addition, this may also help suppress zero order reflections at the scale grating 80. In some such embodiments, the source light 250 is provided by a polarizing or polarization-maintaining optical fiber, and the source light 250 is polarized such that the light beams 254A and 254B are substantially s-polarized with respect to the plane of the scale grating 80.

Only the light of the +1 and −1 diffraction orders returning from the scale grating 80 are illustrated in FIG. 2 (as broken-line arrows 255A and 255B), since only the light and interference arising from these +/− 1st diffraction orders is intended to provide the measuring signal in various embodiments according to this invention. It should be appreciated that only the central rays of the various diffracted and reflected beams are shown in FIGS. 2 and 3. The +/− 1st diffraction orders are diffracted and reflected as the scale light beams 255A and 255B as shown in FIG. 2. When the scale grating 80 has a fine pitch, (e.g., less than 0.6 microns, and especially approximately 0.5 microns or less), $2^{nd}$, $3^{rd}$ and higher orders of diffraction from the scale grating may be evanescent or the readhead arrangement 200 may be configured such that they follow a path that does not allow them to reach the receiver channels of the readhead. Similarly, the readhead arrangement 200 may be configured such that zero order reflections from the scale grating 80 follow a path that does not allow them to reach the receiver channels of the readhead, as described further below.

Referring now to FIG. 3, beams 255A and 255B are reflected by the side mirrors 88A and 88B, respectively, toward an interference field generating grating 95, where they provide illumination zones 90A and 90B, respectively. The illumination zones 90A and 90B are indicated by the dashed circles 90A' and 90B' showing the approximate cross-section of the illumination zones 90A and 90B at a plane generally coinciding with the interference field generating grating 95. It is convenient to describe the overlapping portions of the illumination zones 90A and 90B as defining an interference illumination zone or field 92 at that plane. The various interference field generating gratings disclosed herein are each positioned in the interference illumination zone 92. The interference field generating grating 95 may be a phase grating that includes grating elements arranged periodically along the direction of the measuring axis 82 according to an interference field generating grating period or pitch 96 ($P_{ig}$). The interference field generating grating 95 transmits and diffracts the rays of the beams 255A and 255B to provide a desired nominal convergence angle as represented by the interfering rays 265. The interference field generating grating 95 thus controls the interference period or fringe pitch 83 ($P_{if}$) of a set of interference fringes 266, to provide the desired fringe pitch $P_{if}$ at the receiving plane 160, for the rays that pass through the grating 95. The interference fringes 266 consist of light and dark interference fringe zones, each extending perpendicular to the measuring axis 82 along both the Z and Y directions. Accordingly, provided that the interference fringes 266 overlap all receivers in the receiving plane 160, the distance between the receiver plane 160 and the interference field generating grating 95 is not critical, and is generally determined according to other readhead design considerations.

At the receiver plane 160, for each respective fiber-optic receiver channel 190, the respective phase mask 120 spatially filters the incoming interference fringes 266. When the exemplary embodiment shown in FIG. 1 is used in the generic readhead configuration shown in FIGS. 2 and 3, the respective phase masks 120A, 120B, and 120C each have a mask pitch $P_m$ that is the same as the interference fringe pitch $P_{if}$, and they are arranged at respective spatial phase positions of 0 degrees, 120 degrees and 240 degrees in terms of the interference fringe pitch $P_{if}$. Thus, the fiber-optic receiver channels 190A, 190B, and 190C receive illumination that is similarly spatially filtered, except for a spatial phase difference. Thus, the optical signals 191A, 191B, and 191C, corresponding to the optical receiver channels 190A, 190B, and 190C show approximately identical sinusoidal intensity variations as the scale grating 80 moves along the measuring axis, but with relative phase shifts of 120 degrees. Well known methods are available for determining the displacement of the scale grating 80 relative to the phase masks 120A, 120B, and 120C based on such "three-phase" displacement signals. Thus, the exemplary fiber-optic readhead arrangement 200 shown in FIGS. 2-3 provides a displacement measuring system usable in a variety of fiber-optic readheads according to this invention.

It will be appreciated that both the interference field generating grating 95 and the source grating 85 are located in the interference illumination zone 92. In various embodiments, the interference field generating grating 95 may surround the source grating 85, or, in other embodiments they may be located adjacent to one another. In various embodiments, the interference field generating grating 95 and the source grating 85 may be fabricated on the same substrate, on the same surface, on opposite surfaces of a substrate, or on the surfaces of separate substrates that abut one another. In some embodiments, when the scale grating pitch is approximately 0.8 microns or more, the same grating may be used for both the interference field generating grating 95 and the source grating 85.

It should be appreciated that because the light in each of the +1 and −1 diffraction orders that gives rise to the detected interference fringes is diffracted once only by the scale grating 80, when the grating 80 moves by one pitch increment cycle the corresponding fringes 266 in the interference illumination field 92 will move by 2 cycles. That is, for the embodiment shown in FIGS. 2-3, as the scale grating 80 moves by an increment $P_g$ along the measuring axis, the interference fringes 266 in the interference illumination field 92 move by an increment of $2*(P_{if})$ relative to the phase masks 120.

The exemplary fiber-optic readhead arrangement 200 provides a three-phase measurement system. However, it will be appreciated that alternative embodiments of the phase masks 120, along with corresponding alternative arrangements of the optical receiver channels 190 are usable in the generic fiber-optic readhead arrangement 200. Various exemplary embodiments of the phase masks 120, including embodiments that provide optical signals having a quadrature phase relationship, or other phase relationships, are apparent to one skilled in the art.

Figure 4:
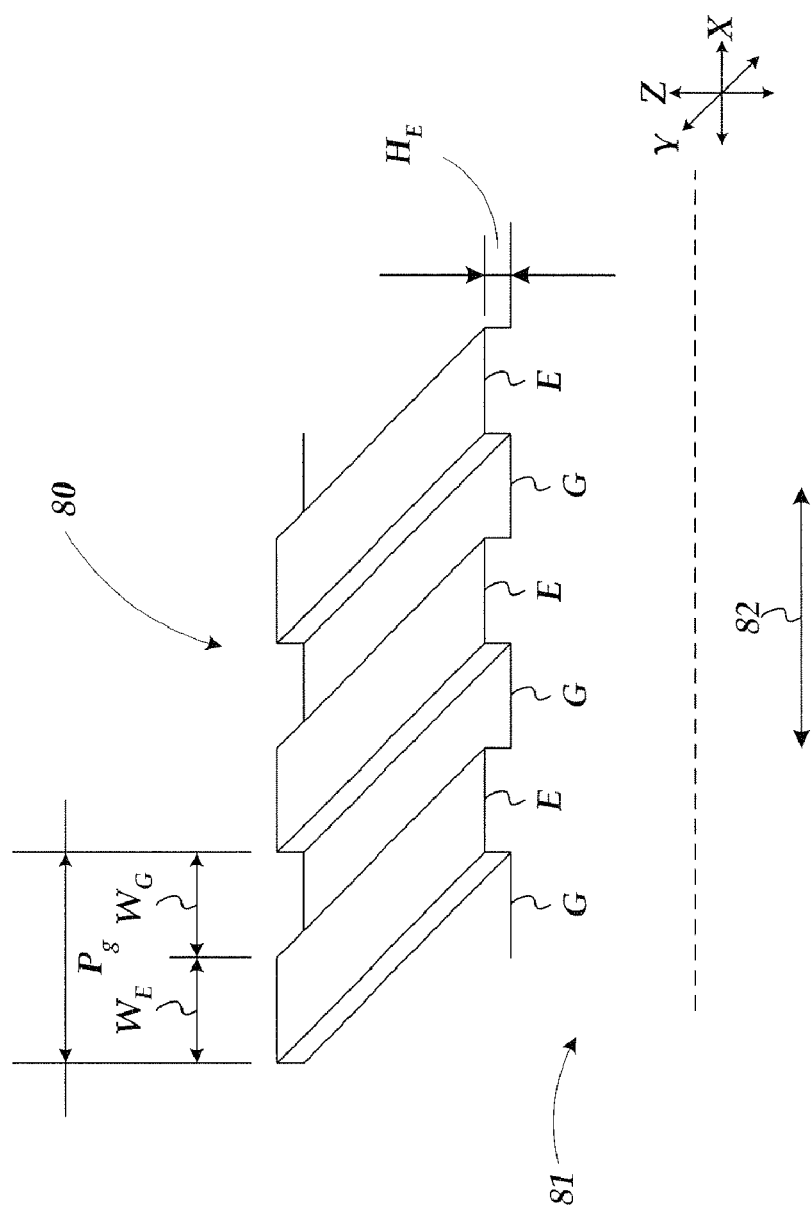
FIG. 4 is an isometric view showing the grating structure of a first exemplary embodiment of a phase scale grating according to this invention.

FIG. 4 shows a one exemplary embodiment of the scale grating 80. The scale grating of FIG. 4 is designed to suppress the zero order reflections. The scale grating 80 is a reflective phase grating formed on a substrate 81, and is aligned along a measuring axis 82. The scale grating 80 includes grating elements E extending along the direction of the Y-axis, perpendicular to the measuring axis 82, that are separated by recessed elements G. Grating elements E are arranged periodically along the measuring axis 82, according to a grating pitch $P_g$. Each of the grating elements E has a width $W_E$ along the direction of the measuring axis 82, while each of the recessed elements G has a width $W_G$. The grating elements E also have a height $H_E$ along the direction of the Z-axis.

As described above, the scale grating 80 of FIG. 4 is designed to suppress the $0^{th}$ order reflected light. Methods for accomplishing this are known in the art. For example, in one exemplary embodiment, the scale grating 80 may be formed as a reflective phase grating with a reflective coating, chrome for example, on both the rectangular grating elements E and the recessed elements G, and with a height $H_E$ that causes destructive interference of the $0^{th}$ order reflected light, for example a height of ¼ of the wavelength of the source light. A 50% duty cycle, that is, $W_E$ approximately equal to $W_G$, contributes to the best suppression of the $0^{th}$ order reflected light and also suppresses the rest of the even diffraction orders. The zero order reflection suppression may be very effective for beams that are incident on the grating along a normal direction. Therefore, if some portion of the source light 250 is transmitted directly through the source grating 85 to the scale grating 80, it may generally be suppressed such that it is not reflected back to interfere with the desired operation of a readhead according to this invention. Various design factors are illustrated with reference to EQUATIONS 1 and 2 below. The phase change $\varphi$ of the reflected light having the wavelength $\lambda$ after traversing the distance $H_E$, to and from the recessed elements G, is:

$$\varphi = -4\pi \frac{H_E}{\lambda} \quad \text{(Eqn. 1)}$$

For destructive interference between the light reflected from the rectangular grating elements E and the recessed elements G, the height $H_E$ is chosen such that:

$$\varphi = k\pi \text{(with } k \text{ an odd integer)} \quad \text{(Eq. 2)}$$

Other ways of suppressing and/or directing away the zero-order reflected light with a grating are also known in the art, such as utilizing diffractive scale elements with blazes at first diffraction orders, or using a sinusoidal grating. For gratings with pitches significantly greater than the wavelength of the incident light, a sinusoidal grating structure would allow for the suppression of all diffraction orders except for the plus and minus first orders, which accomplishes the design goals set forth above. However, a sinusoidal grating structure is generally more costly to manufacture than a rectangular grating such as that illustrated in FIG. 4. As will be described in more detail below, when using a rectangular scale grating 80 such as that illustrated in FIG. 4, various features may be incorporated into a fiber-optic readhead according to this invention, to reject the remaining higher order diffraction orders other than the desired plus and minus first orders.

Figure 5:
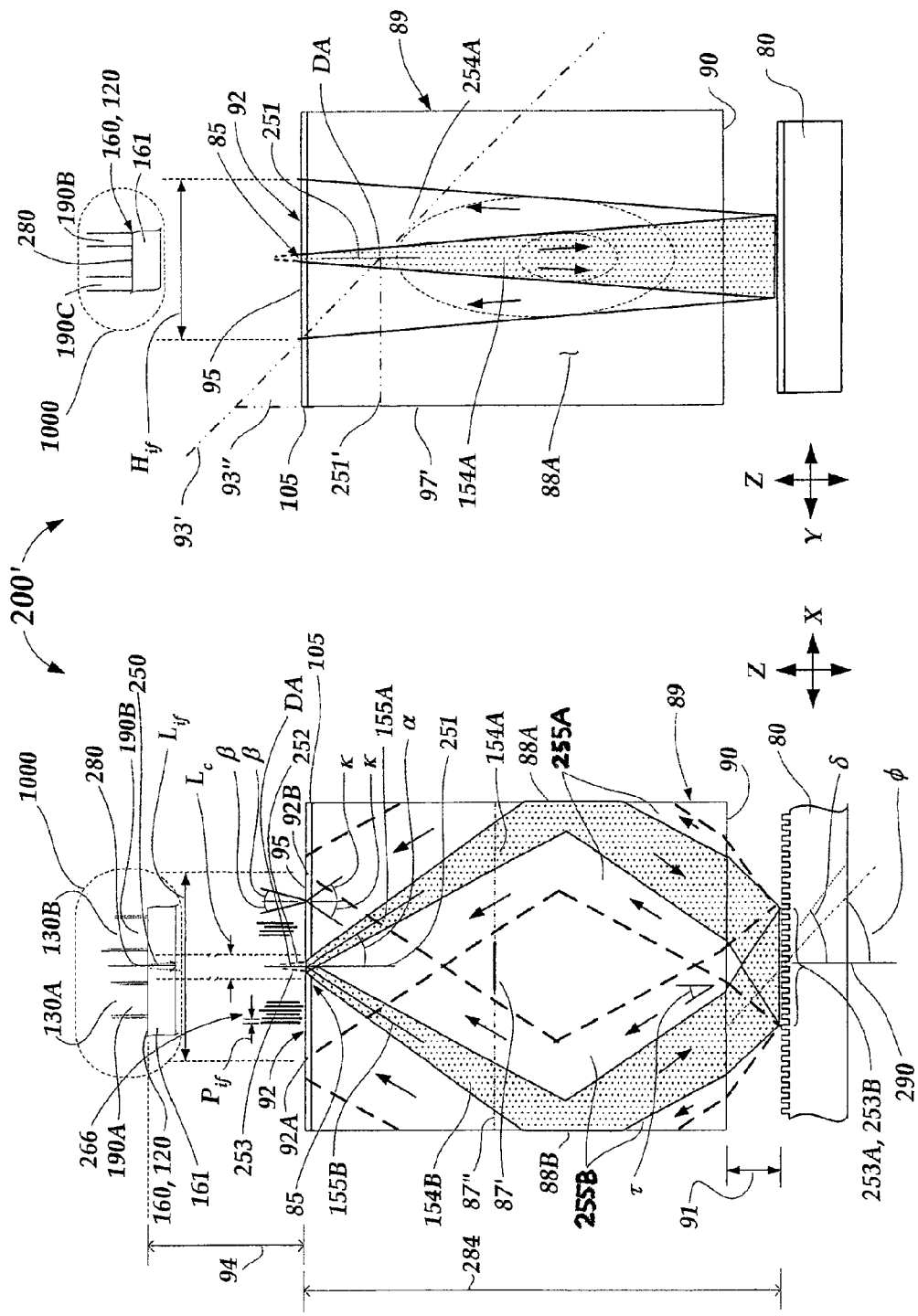
FIG. 5A is a schematic view in the X-Z plane of an exemplary fiber-optic readhead according to this invention, illustrating one exemplary configuration of various light beams operably positioned relative to the scale grating according to the principles of this invention.
FIG. 5B is a view in the Y-Z plane of the arrangement of FIG. 5A.

FIGS. 5A and 5B illustrate a first operational fiber-optic readhead 200' that implements the principles of the generic interferometric fiber-optic readhead arrangement 200. Certain functional features previously described with respect to FIGS. 1-3 may be similarly numbered in FIGS. 5A and 5B. The particular illustrated embodiments of certain previously described features may also be similarly numbered, but with "primes" added. Various dimensions may be exaggerated in FIGS. 5A and 5B, e.g., the dimension 94, so that certain features may be seen more clearly. As best shown in FIG. 5A, the fiber-optic readhead 200' includes a fiber-optic spatial phase mask assembly 1000 that comprises a plurality of fiber optic receiver channels 190 abutting a phase mask element 161 that includes spatial phase masks 120 on the abutted surface, and a fiber-optic light source 280. That light source 280 emits a diverging source light 250 generally along a source light axis 251 through the phase mask element 161, the source light diverging as indicated schematically by the dashed lines 252 and 253 at a diverging half angle of DA. The source light has a nominal wavelength $\lambda$. The source light 250 is diffracted and split by a source grating 85 into the desired +1 and −1 order source light beams 154A and 154B. The source grating 85 may be a transmissive type phase grating fabricated in, or on, a portion of a surface of a grating substrate 105. In the illustrated embodiment the source grating 85 extends the length "Lc" in the measuring axis direction and has an effective source grating period or pitch of Ps that produces a desired diffraction angle $\alpha$. The +1 and −1 order source light beams 154A and 154B propagate generally along nominal light paths 155A and 155B, each at the angle $\alpha$ with respect to the source light axis 251. The +/− 1st order source light beams 154A and 154B, each comprising diverging rays, are then reflected by the side mirrors 88A and 88B toward the scale grating 80. In the illustrated embodiment, the side mirrors 88A and 88B extend generally perpendicular to the scale grating 80. In various other embodiments, the side mirrors 88A and 88B may form various angles relative to the scale grating 80 as long as they otherwise satisfy various design constraints, as discussed further below.

In the illustrated embodiment, the side mirrors 88A and 88B are provided as two opposing sides of an optical block 89, which may be a generally rectangular parallelepiped. The mirrors 88A and 88B may be provided as aluminum-coated side surfaces of the block 89. Alternatively, in certain configurations, the desired reflections may be provided by total internal reflection (TIR) of the light at the block-air interfaces at the sides of the block 89. In the illustrated embodiment, one end (e.g., the top end) of the optical block 89 is defined by the source grating 85, while the other end of the optical block 89 is defined by a surface 90 that is configured to pass (and refract) the +1 and −1 order source light beams 154A and 154B, reflected by the side mirrors 88A and 88B, at a suitable angle so that they will have a nominal angle of incidence $\phi$ on the scale grating 80. The surface 90 is spaced apart from the scale grating 80 by an operating gap 91. In various embodiments, the nominal angle of incidence $\phi$ may be the Littrow angle, although other angles may be used in various other embodiments. In some embodiments, the surface 90 of the block 89 may have an anti-reflection coating that suppresses internal reflections. In some embodiments where the angle of incidence is close to Brewster's angle, and s-polarized light is used as previously outlined, the Brewster condition may be approximately fulfilled for light beams re-entering the optical block 89 after diffracting from the scale grating 80. This may eliminate the need for an anti-reflection coating on the surface 90.

From the scale grating 80, +/− 1st diffraction orders, each comprising diverging rays, are reflectively diffracted at an angle $\delta$, as the scale light beams 254A and 254B. The angle $\delta$ may be the same as the angle $\phi$, when $\phi$ is the Littrow angle. The scale light beams 254A and 254B are then refracted at the surface 90 and continue at the angle $\tau$ (relative to the normal vector of the surface 90) to be reflected by the side mirrors 88A and 88B, respectively, and are then incident on the interference field generating grating 95 at a nominal angle of incidence $\kappa$. When the side mirrors 88A and 88B are parallel, and perpendicular to the surface 90, the angle κ will equal the angle τ. The scale light beams 254A and 254B, each comprising diverging rays, are then diffracted by the interference field generating grating 95 to exit the grating at a desired nominal angle "β." The interference field generating grating 95 may be a transmissive type phase grating fabricated in, or on, a portion of a surface of the grating substrate 105 that generally surrounds the source grating 85. In the illustrated embodiment the interference field generating grating 95 has an effective pitch ($P_{ig}$, as previously described with reference to FIG. 3) that produces the desired nominal angles "β." The dimension '$L_{if}$' illustrated between the rays 92A and 92B in FIG. 5A, and "$H_{if}$," illustrated in FIG. 5B, coincide with the limits of the interference illumination zone 92, previously described with reference to FIG. 3. In general, the grating 95 is located in the interference illumination zone 92 and the readhead 200' is configured such that locations and sizes of both the interference illumination zone 92 and the grating 95 insure that the interference fringes 266 that have the fringe pitch $P_{if}$ illuminate the entire input aperture of each of the fiber-optic receiver channels 190 that are included in the readhead 200', e.g., the illustrated channels 190A and 190B, and the like. It should be appreciated that the dimension "$L_c$" of the source grating 85 may be sufficiently small, for example, 50-200 um, as compared to dimensions $L_{if}$ and $H_{if}$, which may be on the order of approximately 1 mm, so that the source grating 85 need not interfere with the detection of the motion of the interference fringes 266 in the vicinity of the of the fiber-optic receiver channels 190 that may generally surround it. In various exemplary embodiments of the present invention, the gratings 85 and 95 may be configured differently from one another, so that each optimally performs its function as outlined further below. In some embodiments, when the scale grating pitch is approximately 0.8 microns or more, the same grating may be used for both the interference field generating grating 95 and the source grating 85.

The gratings 85 and 95 may be fabricated on the upper surface of the substrate 105 (toward the top of FIGS. 5A and 5B), and the lower surface of the substrate may have an anti-reflection coating that suppresses internal reflections (for example, when it is not possible to use s-polarized light incident at the Brewster angle in order to suppress internal reflections). The transmissive phase gratings 85 and 95 may be fabricated to suppress zero order and even order transmissions according to known techniques, and/or according to various techniques disclosed in U.S. Pat. No. 4,426,130 to Knop (the '130 patent), which is hereby incorporated herein by reference. The '130 patent discloses transmissive gratings that effectively suppress all significant orders other than the $1^{st}$ diffraction orders. Alternatively, various custom grating vendors can now provide custom diffractive optical element or holographic gratings that, in effect, simply deflect all incoming light rays and transmit them at the desired nominal angle β. In various embodiments, known techniques (for example, those taught in the '130 patent, or others) may be used to form the gratings 85 and 95 directly in or on a surface of the optical block 89, over an anti-reflection coating, if desired. In such embodiments, the substrate 105 may be omitted.

As illustrated, the readhead 200' may comprise a stable monolithic element that comprises at least the gratings 85 and 95, the block 89, and the mirrors 88A and 88B. The phase mask element 161 may comprise a transparent substrate that includes the phase masks of all the fiber-optic receiver channels 190 on a surface that abuts the optical fibers 130. In various embodiments, the other surface of the phase mask element 161 may be fastened to abut the gratings 85 and 95.

In such an embodiment, the dimension 94 (the divergence gap) may be approximately the same as the thickness of the phase mask element 161, and the entire readhead 200' may be formed or assembled as a stable block-like element, if desired. As previously noted, one design consideration may be to insure that the source light diverges to span enough periods of the source grating 85, such that it operates in the desired manner. In addition, as previously indicated, it may be desirable to fabricate the gratings 85 and 95 such that their grooves are filled with air, and not some material with a higher index of refraction (e.g., adhesive or the like), in order to economically provide the desired diffraction angles.

The majority of signal processing techniques for interpolating the raw measurement signals in encoders assume that such signals are ideal or nearly ideal sinusoidal functions of relative displacement between the scale and readhead. Thus, interpolation errors arise due to non-ideal, non-sinusoidal signals, and/or to other factors that decrease the signal to noise (S/N) ratio. It should be appreciated that all light other than the +/− 1st order light degrades the S/N ratio and/or contributes to non-ideal, non-sinusoidal signals if it reaches the receiver apertures of a fiber-optic readhead according to this invention. As described above, the structure of the scale grating 80 and the readhead gratings 85 and 95, may be designed according to known methods to suppress at least the zero order and even-numbered diffraction orders. In addition, in various embodiments, the collection NA of the receiver fibers of the of the fiber-optic receiver channels 190 may be such that light from diffraction orders higher than the +/− 1st diffraction orders has an angle of incidence that effectively prevents it from entering the fiber-optic receiver channels 190. Furthermore, in various exemplary embodiments, a readhead according to this invention may be designed and operably positioned relative to the scale grating 80 such that it avoids reception of the +/− 3rd diffraction orders from the scale grating (if any), and such that light from the zero-order reflection of the beams that are incident at the angle φ on the scale grating 80 falls outside of the operable optical paths of the readhead. As one example, with reference to FIG. 5A, if the optical block 89 is made narrower along the X axis direction than that which is currently illustrated in FIG. 5A, the reflection of the beams 154A and 154B will take place above the shown position on the mirrors 88A and 88B (farther toward the top of the figure), and their resulting illumination spots 253A and 253B on the scale grating 80 will each be shifted away from the mid-plane 290 of the optical block 89. If the block is made sufficiently narrow along the X direction, the zero, $2^{nd}$, and $3^{nd}$ order light which might otherwise reenter the optical block 89 will be directed outside the mirrored surfaces of the optical block 89, and leave the system. In addition, or alternatively, the operating gap 91 may be increased to provide the same effect. One tradeoff with this technique of eliminating unwanted light is that the illumination spots 253A and 253B become separated on the scale grating 80. This may increase the sensitivity of the system to errors that may arise from dynamic pitch (slight rotation of the readhead about the Y axis), or waviness of the scale, during operation. Thus, it is desirable to design a readhead according to this invention such that light other than the desired $1^{st}$ order light is sufficiently suppressed or eliminated from the signal path by any of the means outlined herein, while at the same time causing the illumination spots 253A and 253B to overlap as much as possible.

In some embodiments, a source grating may transmit some residual zero-order light. In such a case, if the residual light is detrimental to operation, the readhead 200' may incorporate a zero-order light blocking element 87', as shown in FIG. 5A. In one embodiment, the optical block 89 may be fabricated as two sub-blocks having surfaces that are bonded at the line 87". One of the surfaces may have the light blocking element 87' formed on it prior to bonding (e.g., by a dark chrome thin film process, or the like). Ideally, the size of the light blocking element 87' is such that it blocks the zero-order light, but not the operative portion of the beams 254A and 254B. Alternatively, in some embodiments, a light blocking element may be provided by providing a hole or slot along the X-axis direction through optical block 89 at an appropriate location (e.g., by laser machining or the like), and filling or coating the inside of the hole with a light blocking material. Advantageously, for such an embodiment the optical block 89 need not be fabricated as two sub-blocks. Alternatively, in some embodiments, a zero-order light blocking element may be fabricated on the bottom surface 90 of the optical block 89, when it is possible to block the zero-order light at that location without significantly blocking the operative portion of the beams 154A, 154B, 254A, and 254B.

Design choices regarding the tradeoffs between costs of grating complexity and antireflection coatings, lost illumination energy, signal accuracy, and dynamic pitch (or scale waviness) error sensitivity may be determined or verified by optical analysis, simulation, and/or experiment. In some cases, with very fine pitch scale gratings, the +/− 3$^{rd}$ diffraction orders may be evanescent when the angle of incidence $\phi$ is properly chosen, and need not be a consideration in other aspects of the design. In various embodiments, the angle of incidence $\phi$ may advantageously be the Littrow angle.

The following design equations may be used, in an iterative procedure if necessary, to determine a self-consistent set of effective grating pitches and light path angles that provide a satisfactory readhead design according to the previously described principles. In general, the dimensions of the optical block 89 and the dimension of the operating gap 91 may also be considered according to previously described principles. The following equations consider the central ray of each operative light beam. In general, each operative light beam is diverging, in order to provide an interference fringe field large enough to fill each of the fiber-optic receiver channels apertures. The effects of diverging rays on the measurement signal may be determined, and minor design adjustments made if necessary, based on simulation and/or experiment. Assuming that the source light is incident normal to the source grating 85, the diffraction angle $\alpha$ may be determined from the equation:

$$\lambda/n = P_S(\sin \alpha) \quad \text{(Eq. 3)}$$

where $\lambda$ is the wavelength of the source light used in the readhead, and n is the index of refraction of the optical block 89.

Assuming the surface 90 and the planes of the all gratings are nominally parallel, the following equations define the interrelationships of various other angles and effective grating pitches, which are defined as shown in FIG. 5A.

$$\lambda/n = P_{ig}(\sin \kappa + \sin \beta) \quad \text{(Eq. 4)}$$

$$\lambda = P_g(\sin \phi + \sin \delta) \quad \text{(Eq. 5)}$$

$$\sin \delta = n \sin \tau \quad \text{(Eq. 6)}$$

$$\sin \phi = n \sin \alpha \quad \text{(Eq. 7)}$$

If the mirrored sides of the optical block 89 are symmetrically angled, but not parallel as shown in FIG. 5A, then in EQUATION 7, the angle $\alpha$ should be replaced with the actual angle of incidence of the reflected beams 154A and 154B, relative to the surface 90. It will be appreciated that if the mirrored sides of the optical block 89 are parallel, and perpendicular to the surface 90, the angle $\kappa$ will equal the angle $\tau$. Furthermore, if the angle $\phi$ is the Littrow angle, then the angle 6 will equal the angle $\phi$, and the angles $\kappa$ and $\tau$ will equal the angle $\alpha$.

Certain example parameter values can be used to illustrate the operation of these equations. In one exemplary embodiment, the readhead can use a wavelength $\lambda$ of 635 nm. The optical block 89 can be made of fused quartz, having an index of refraction n=1.457 at 635 nm, and it may have an X direction dimension of approximately 1.2 mm, a Y direction dimension of approximately 2.5 mm, and a Z direction dimension of approximately 1.5 mm. The various gratings may have effective grating pitches of $P_g$=0.40 microns, $P_s$=0.80 microns, and $P_{ig}$=0.888 microns, which provides diffraction at the Littrow angle at the scale grating 80. The resulting interference fringe pitch $P_{if}$ is about 4 um, and the spatial-phase gratings 120 of the fiber-optic receiver channels 190 may be amplitude gratings, each having a pitch that matches the fringe pitch $P_{if}$. The source light divergence half angle DA may be approximately 1.96-2.75 degrees, and a nominal operating gap 91 of approximately 200 microns may be used. If the operating gap 91 is increased to 275 microns, the zero order reflection will miss the edge of the detector, but the dynamic pitch error sensitivity will increase somewhat, according to previously outlined principles. As another example, the various gratings may have effective grating pitches of $P_g$=0.40 microns, $P_s$=0.816 microns, $P_{ig}$=0.816 microns, and the operating gap may be approximately 419 microns. The illumination spots 253A and 253B will not coincide on the scale grating 80 in this case. The resulting interference fringe pitch $P_{if}$ is about 20 microns, and the spatial-phase gratings 120 should then have that same 20 micron pitch.

In one alternative embodiment, an optical block analogous to the optical block 89 may include an angled mirrored surface that deflects the operable light beams of a fiber-optic readhead that operates in a manner analogous to the fiber-optic readhead 200'. For example, the angled mirrored surface may be positioned approximately at the position indicated by the dashed line 93' shown in FIG. 5B. The portion of the optical block above the dashed line 93' would be absent in such an embodiment, and the portion 93" may be added to the block. The configuration of elements 105, 85, 95, and 1000 would be "rotated counter-clockwise in the plane of FIG. 5B" by 90 degrees (relative to their illustrated orientation in FIG. 5B), and relocated to a position against the upper left side surface 97', such that the gratings are parallel to the X-Z plane, and the source light from the reoriented light source 280 is aligned along the reoriented source light axis 251'. Such an alternative embodiments is described further below with reference to FIG. 13.

It should be appreciated that in various embodiments, a readhead substantially similar to the readhead 200' may be fabricated without the use of the optical block 89. In one such embodiment, the mirrors 88A and 88B may be fabricated on individual substrates. The gratings 85 and 95 on the substrate 105, the individual mirror substrates, and the fiber-optic spatial phase mask assembly 1000 may then be fixed in the proper relationships on a suitable readhead frame or housing (not shown). In such embodiments, the majority or all of the optical path(s) from the source grating 85, to the pair of mirrors 88A and 88B, to the scale grating 80, back to the mirrors 88A and 88B and back to the interference field generating grating 95 may be in air. This configuration may be advantageous for providing the desired beam path angles in a compact configuration, when the scale grating pitch is approximately 1 microns, or 2 microns, or more, for example. A zero-order light blocking element may also be added to such an embodiment, if desired. In some embodiments one or both of the gratings 85 and 95 may be replaced by alternative elements that provide similar functions, such as miniature beam splitting cubes, and/or prisms, and/or reflective surface arrangements, and the like.

In various exemplary embodiments according to this invention, a particularly simple and effective embodiment of the light source 280 is the end of a single optical fiber that emits coherent or quasi-coherent light provided by a remote laser diode or other light source that is operational to provide the desired interference fringes, as described above. In various exemplary embodiments, such a fiber-optic light source is a single mode fiber without a separate lens or collimator that outputs a diverging source light beam from its end, the diverging light beam typically having a divergence half angle at half maximum intensity in the range of 1.96-2.75 degrees for a single mode fiber. As previously indicated, to achieve good diffraction efficiency with very fine pitch scale gratings (e.g., when the scale grating pitch is as small as 1.5 microns, or 1.0 micron, or on the order of the wavelength of the light used in the readhead, or less) it is desirable that the light beams that reach the scale grating are substantially s-polarized at the scale grating. In such embodiments, an optical fiber light source may include a polarization-maintaining optical fiber, that outputs source light having the desired polarization. In yet other exemplary embodiments, the light source 280 is provided by a miniature semiconductor laser element in the fiber-optic readhead. In such cases, it should be appreciated that the readhead construction may become more complex and costly, and some of the benefits of an all-optical readhead are lost. However, even in such cases, at least some of the benefits of a readhead arrangement according to this invention will remain.

Figure 6:
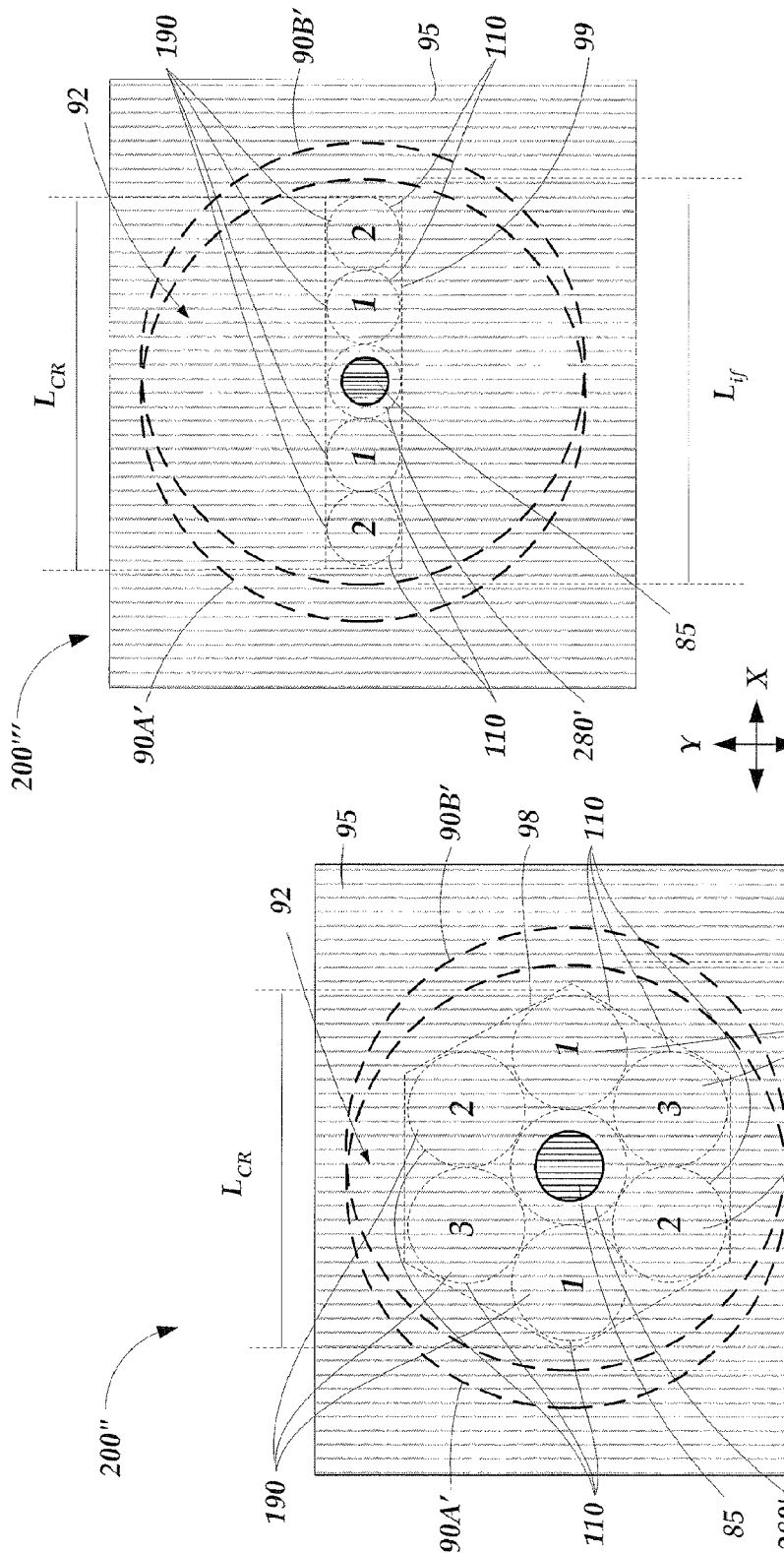
FIGS. 6A and 6B illustrate first and second grating arrangements usable in a fiber-optic readhead according to this invention.

FIGS. 6A and 6B illustrate certain features of first and second exemplary readhead arrangements 200″ and 200‴ as viewed along the Z axis direction, each including a plurality of fiber-optic receiver channels 190, a fiber-optic light source channel 280′ that provides a light source 280, a source grating 85, and an interference field generating grating 95. The receiver channel arrangement 98 of FIG. 6A may produce three-phase type signals, and includes three complementary pairs (1-1, 2-2, and 3-3) of receiver channels 190, as will be more fully described below in reference to FIGS. 8 and 9, which surround the light source channel 280′. The receiver channel arrangement 99 of FIG. 6B may produce quadrature type signals, and includes two complementary pairs (1-1 and 2-2) of receiver channels 190, which are symmetrically positioned about the centrally located light source channel 280′. Herein, a complementary pair refers to two receiver channels that have phase mask spatial phases that are 180 degrees out of phase. For such arrangements, one of the pair of signals from a complementary pair may be subtracted from the other, and potential errors due to DC offsets, dynamic yaw and pitch, or scale waviness that may appear in each channel may nominally cancel each other when the difference is taken between the complementary pair signals. Alternatively, a "balanced pair" design and signal processing approach, described in the incorporated references, may be used in various embodiments according to this invention.

The receiver channel apertures 110 of the receiver channel arrangements 98 and 99 are schematically represented and are nominally concentric with the respective optical fibers of the respective receiver channels 190. The dashed circles represent the illumination zones 90A′ and 90B′ produced by the +1 and −1 diffraction order scale light beams 255A and 255B (as previously described with reference to FIG. 3) at the plane of the interference field generating grating 95. The intersection of the illumination zones 90A′ and 90B′ define the previously described interference illumination zone 92, having a dimension $L_{if}$. As illustrated, the readhead arrangements 200″ and 200‴ are designed to ensure that a generic length dimension "LCR", that encompasses the set of receiver channel apertures 110 in the respective readhead arrangements 98 and 99, is less than the length dimension $L_{if}$ of the interference zone 92, and falls entirely within the region of the interference field generating grating 95, to ensure that each of the apertures 110 of the receiver channels 190 receives only high quality interference fringes of the desired fringe pitch.

It should be appreciated that for very fine pitch scale gratings, the yaw tolerance for a readhead is extremely restricted. Some factors related to readhead yaw are described in the incorporated references, and particularly the '315 patent. Due to yaw considerations, it is very desirable to minimize the separation between receiver channels along the direction perpendicular to the measuring axis, so that yaw does not alter their spatial phase relative to one another along the measuring axis direction. To a lesser extent, it is also desirable to minimize the separation between receiver channels along the measuring axis direction. Thus, it should be appreciated that the readhead arrangement 200‴ is superior to the readhead arrangement 200″ with respect to yaw tolerance considerations, and may therefore be preferred in various applications where precise yaw alignment may be difficult to achieve or maintain.

Figure 7:
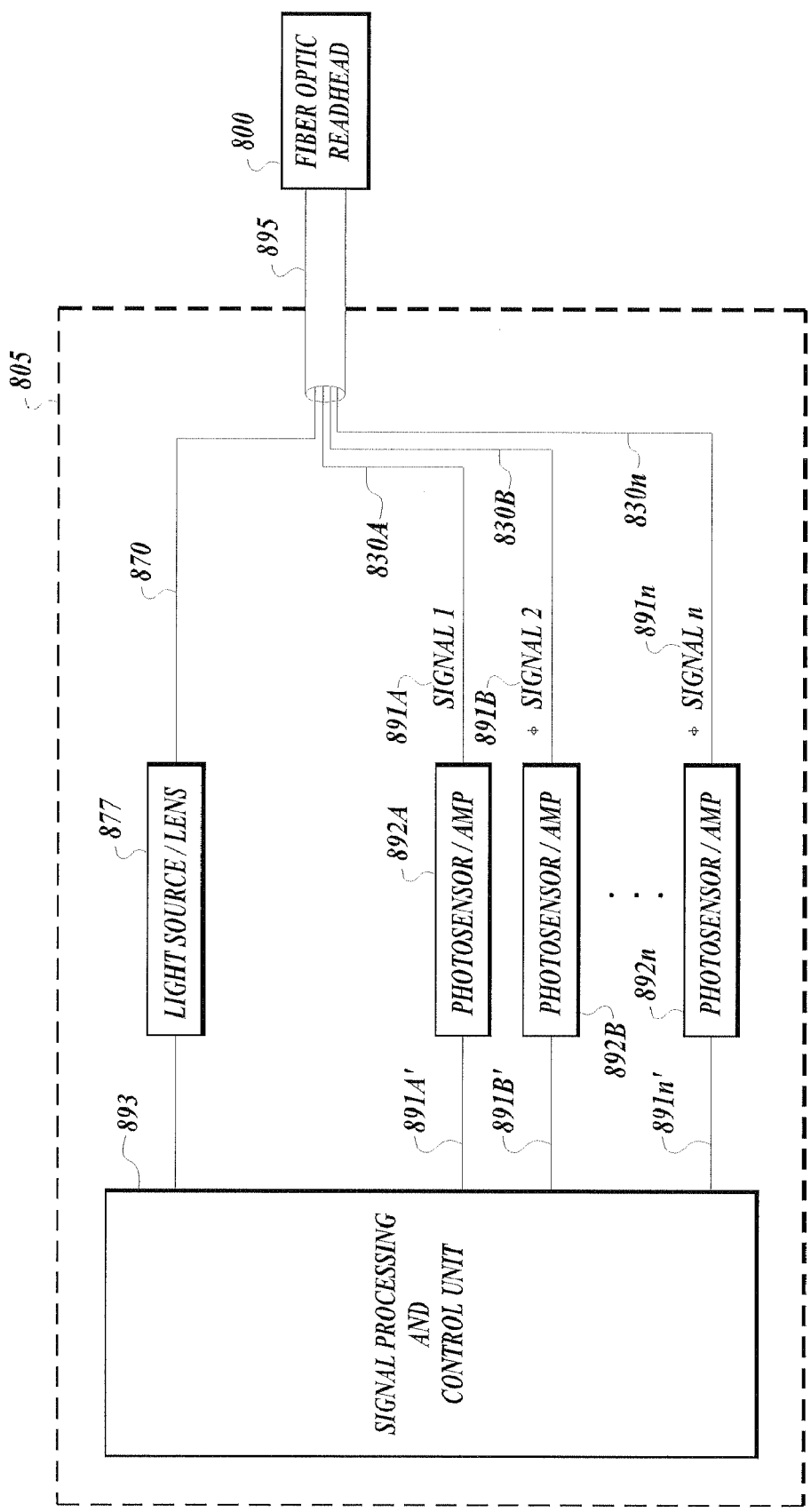
FIG. 7 shows a block diagram including a remote electronic interface unit usable in conjunction with a fiber-optic readhead according to this invention.

FIG. 7 shows a block diagram including a generic remote electronic interface unit 805 that is usable in conjunction with a fiber-optic readhead according to this invention, generically represented by a fiber-optic readhead 800. The remote electronic interface unit 805 includes a signal processing and control unit 893, a light source 877 that may include an optional lens, and an embodiment-specific plurality of photosensor/amps 892A to 892n. The light source/lens 877 may include other optics such as polarizers, optical isolators or the like. The light source/lens 877 and the photosensor/amps 892A to 892n are coupled to the fiber-optic readhead 800 through light source optical fibers 870 and receiver optical fibers 830A to 830n, respectively. The optical fibers 870 and 830A to 830n are routed within a readhead cable 895 that gathers and protects the optical fibers between the fiber-optic readhead 800 and the remote electronic interface unit 805. In various exemplary embodiments according to this invention, the readhead cable may be several meters long or more. The receiver optical fibers 830A to 830n carry the optical signals 891A to 891n, respectively. The optical signals 891A-891n are phase signals provided as describe above and further below.

The light source/lens 877 receives power and may receive gain control signals from the signal processing and control unit 893. As described above, the light source/lens 877 transmits light through the source optical fiber(s) 870 to the scale grating of the fiber-optic readhead 800. The fiber-optic detector channels, such as the fiber-optic receiver channels 190A-190C described above, or the like, receive light from the scale grating of the fiber-optic readhead 800 and provide the signals 891A to 891n, which are input to the photosensor/amps 892A to 892n, respectively. The photosensor/amps 892A to 892n provide amplified electronic output signals 891A′ to 891n′ to the signal processing and control unit 893.

Figure 8:
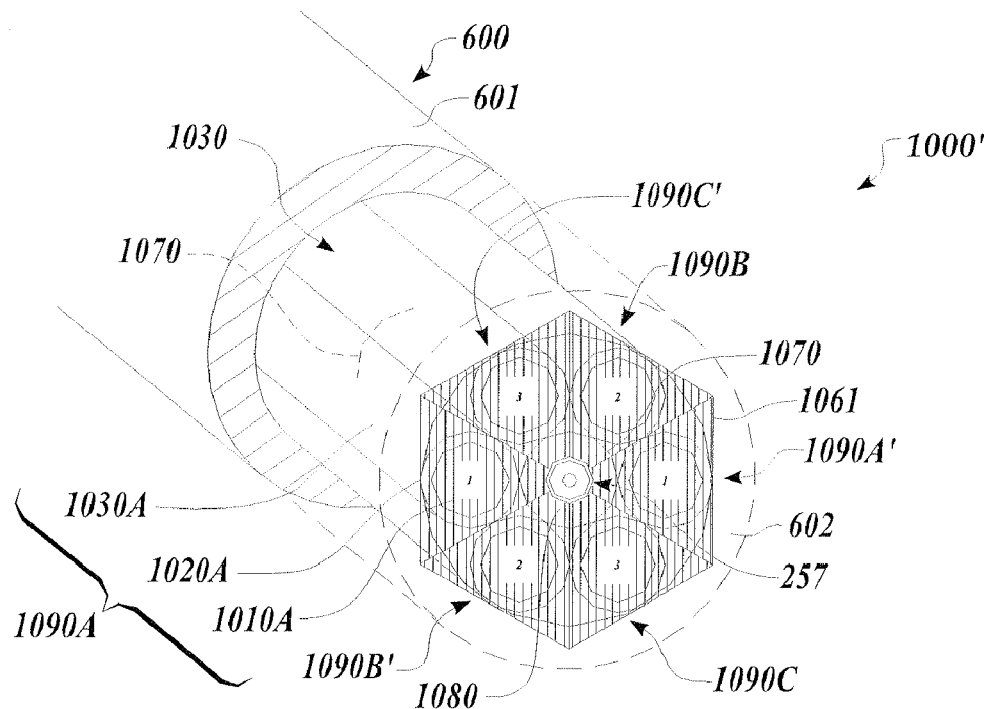
FIG. 8 is a partly orthographic, partly isometric view of an embodiment of a fiber-optic readhead arrangement according to this invention.

FIG. 8 shows an exemplary embodiment of a fiber-optic spatial phase mask assembly 1000′ according to this invention. The fiber-optic spatial phase mask assembly 1000′ may be used in place of the fiber-optic spatial phase mask assembly 1000 shown in FIGS. 5A and 5B, and in various other readhead embodiments according to this invention. The fiber-optic spatial phase mask assembly 1000' includes a fiber optic light source 1080 and otherwise operates substantially similarly to the fiber-optic receiver channel arrangement 100 described above with reference to FIG. 1 and includes components similar to those described above. Due to these similarities in configuration and operation, only certain aspects of the fiber-optic spatial phase mask assembly 1000' that require additional explanation are described below.

As shown in FIG. 8, the fiber-optic spatial phase mask assembly 1000' includes a first set of three fiber-optic receiver channels 1090A-1090C, which operate similarly to the previously described fiber-optic receiver channels 190. It should be appreciated that in one embodiment, the fiber-optic spatial phase mask assembly 1000' may provide a "complementary pair" fiber-optic readhead according to this invention analogous to those outlined with reference FIGS. 6A and 6B. To provide a complementary pair spatial phase mask assembly a second set of three respective balanced fiber-optic receiver channels 1090A'-1090C' are provided and are respectively arranged in "complementary pairs" on opposite sides of a channel arrangement center 257 from the respective fiber-optic receiver channels 1090A-1090C as shown. In such an embodiment, the pairs of numbers 1-1, 2-2, and 3-3 shown on the optical fiber receiver apertures 1010 may be indicative of the complementary pairs.

However, in another embodiment, the pairs of numbers 1-1, 2-2, and 3-3 shown on the optical fiber receiver apertures 1010 may be indicative of fiber-optic receiver channels that have the same spatial phase. In either case, to mitigate certain yaw effects, in one method of signal processing, the first and second sets of three fiber-optic detector channels are signal processed independently to determine respective displacement measurements. Then, the respective displacement measurements are averaged to determine a displacement measurement that may compensate for certain errors that may be present in the respective displacement measurements.

Also shown in FIG. 8 is an assembly housing 600 comprising a cylindrical ferrule 601, shown partially in dashed outlined cutaway. The inner diameter of the ferrule fits with a slight interference fit over the close-packed optical fibers 1030 and 1070. The fibers may be bonding to the ferrule and each other, ground and polished flush with the mounting surface 602 and then a phase mask element 1061 may be aligned to the fiber ends under a microscope and bonded tight to the mounting surface 602. In one exemplary embodiment, the phase masks 1020 are fabricated on the "inside" of the phase mask element 1061, nearest the fiber ends. The hexagonally-shaped phase mask element 1061 is described in detail with reference to FIG. 9, below.

A light source 1080 is provided by the end of a source fiber 1070. In one exemplary embodiment, the source fiber 1070 is a single mode fiber used as a point source for emitting light at a source wavelength of 635 nm, and is the optical fiber part number FS-SN-3224 made by 3M Corporation, that has an outer diameter of $D_{SF}$=250 microns. The receiver optical fibers 1030 are all the same commercially available multi-mode fiber that is a silica fiber with 200/220/250 micron core/cladding/buffer diameters $D_{RA}/D_{RC}/D_{RF}$. Thus, all of the source and receiver fibers in the fiber-optic spatial phase mask assembly 1000' have the same 250 micron outer diameter and can therefore be arranged in an advantageous close packing assembly that allows both highly accurate and economical precision alignment and assembly. In this exemplary embodiment, the advantageous close packing assembly arrangement is a hexagonal close packing assembly arrangement. It should be appreciated that having a matching diameter for the receiver optical fibers 1030 and source fiber 1070 is beneficial for these assembly purposes. The spatial phase mask assembly 1000' may be provided in a diameter of 1.0 mm or less. In this connection, the outer diameter of the assembly housing ferrule 601 may easily be made as small as 1 to 2 mm. It should be appreciated that custom receiver fibers can easily be fabricated (albeit at a slight extra cost than commercially available fibers) that have a larger percentage of core area and thereby can collect more signal.

Figure 9:
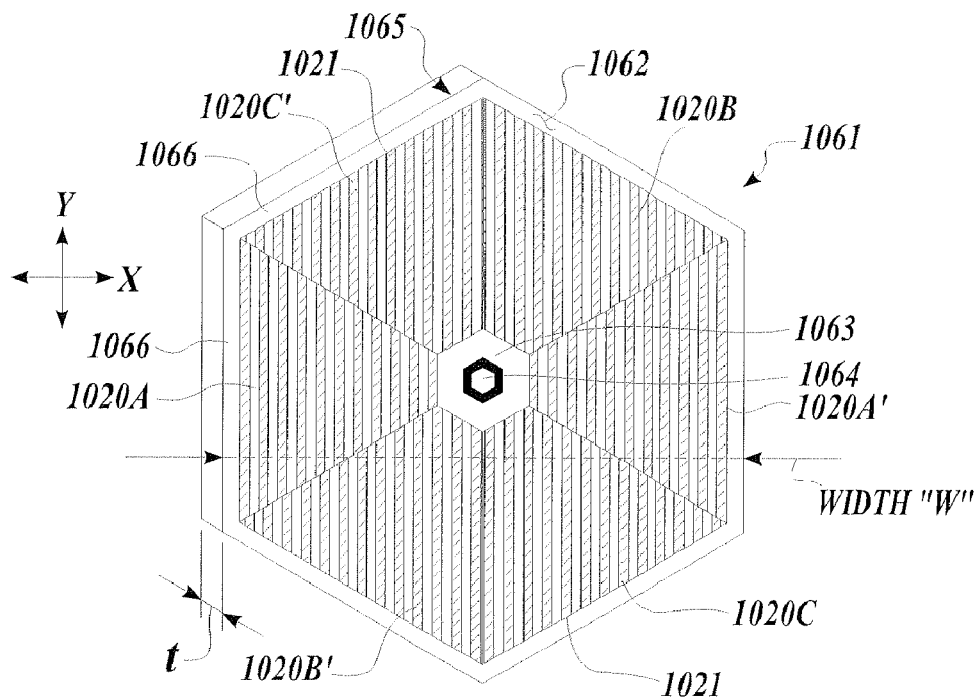
FIG. 9 shows an exemplary phase mask element usable in various fiber-optic readhead arrangements according to this invention.

FIG. 9 shows an exemplary phase mask element 1061 usable in the fiber-optic spatial phase mask assembly 1000'. The phase mask element 1061 includes the spatial phase masks 1020A-1020C and 1020A'-1020C'''. Each of the phase masks 1020 includes grating bars 1021 that are opaque. The grating bars 1021 are arrayed on the surface 1062 of a substrate 1065 of nominal thickness t and nominal width w that is transparent. Chrome, copper, and oxides thereof are common materials that may be used for patterning the grating bars 1021. Glass and quartz are common substrate materials that may be used for the substrate 1065. The substrate 1065 may have edge margins 1066 outside the active mask area to avoid damage to the grating bars during processing. The edge margins 1066 may vary in width around the mask area so that the substrate has hexagonal (as shown), circular, rectangular, or square shape to allow efficient scribing and/or dicing. The active mask area of each of the phase masks 1020A-1020C and 1020A'-1020C' is the area containing the grating bars 1021. This active mask area should be of sufficient size to cover the clear aperture area of the corresponding receiver apertures 1010 with extra tolerance for variations in assembly positioning. Shown at the center of the mask element 1061 is an alignment ring 1063 having a clear aperture 1064 for the source light from the optical fiber 1070, discussed above. The size of the clear aperture is, for example, several times greater than the single-mode core diameter previously described with reference to FIG. 8, which is on the order of 4 microns. In one exemplary embodiment the phase mask element 1061 is made of soda lime glass, has a thickness of 0.25 mm and a width of 2.0 mm, which overhangs the fiber arrangement described with respect to FIG. 8 by a substantial margin, for attachment to a ferrule 601 that has approximately a 2.0 mm outer diameter.

The mask grating bars 1021 are arranged periodically along the X-axis direction according to a period that matches that of the interference fringes, as previously described. The exemplary phase mask element 1061 as shown has 6 phase masks 1020 for use with 6 fiber-optic receiver channels in a configuration where diametrically opposing fiber-optic receiver apertures receive the same phase of light signal modulation with X direction movement of the readhead relative to the scale. The phase masks 1020 have spatial phases of 0 degrees (1020A and 1020A'), 120 degrees (1020B and 1020B'), and 240 degrees (1020C and 1020C'). It will be appreciated that 120 degrees of spatial phase shift corresponds to ⅓ of the previously described fringe pitch $P_{if}$. The boundary between the various phase masks 1020 is easily visible under a microscope for a phase mask element constructed with grating bars 1021 usable in an interferometric encoder. These can be used to align the phase mask element 1061 relative to the receiver fibers.

Figure 10:
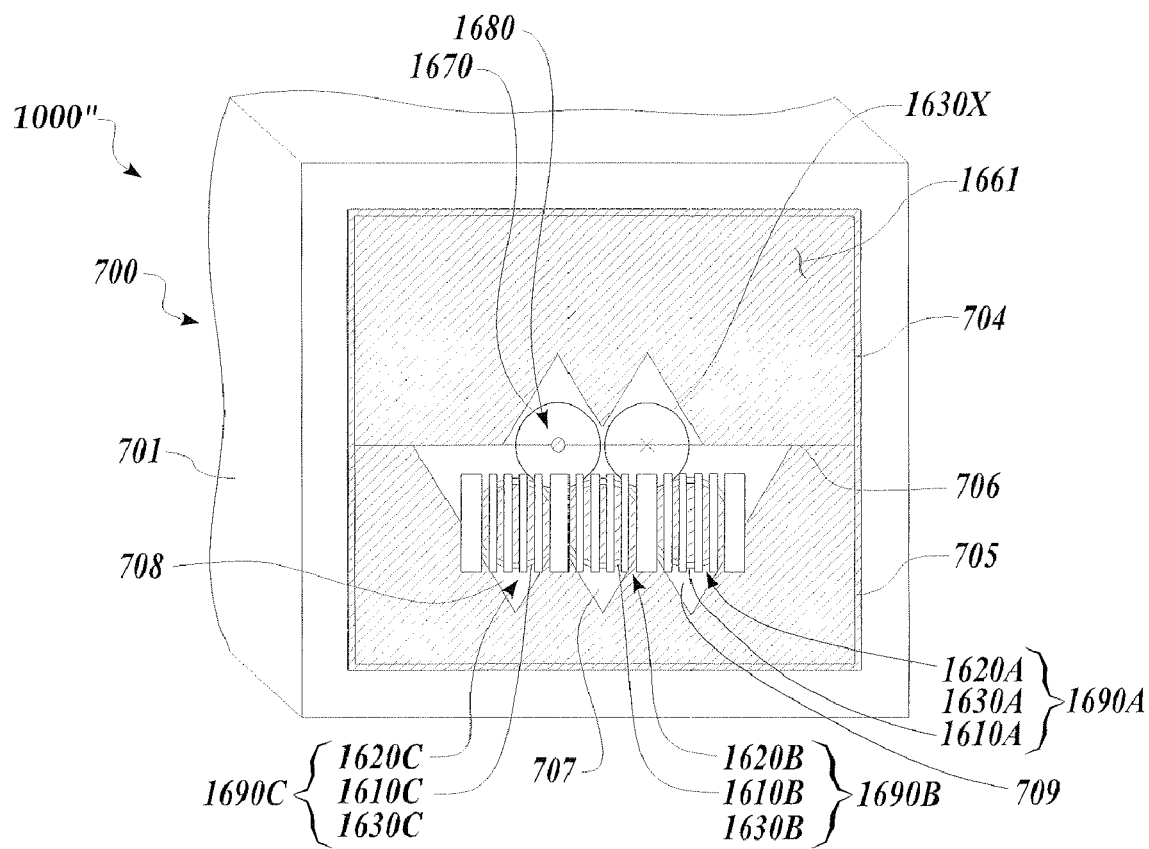
FIG. 10 shows another embodiment of a fiber-optic readhead arrangement according to this invention.

FIG. 10 shows another exemplary embodiment of a fiber-optic spatial phase mask assembly 1000''. The fiber-optic spatial phase mask assembly 1000'' may be used in place of the a fiber-optic spatial phase mask assembly 1000 shown in FIGS. 5A and 5B, and in various other readhead embodiments according to this invention. Three-phase signal processing is described in the previously incorporated '315 patent. Due to similarities in configuration and operation, only certain aspects of the fiber-optic spatial phase mask assembly 1000" that require additional explanation are described below.

As shown in FIG. 10, the fiber-optic spatial phase mask assembly 1000" includes three fiber-optic receiver channels 1690A-1690C, which operate similarly to the previously described fiber-optic receiver channels 190. For example, the fiber-optic receiver channel 1690A includes a receiver channel aperture 1610A, a phase mask 1620A, and a receiver optical fiber 1630A (not shown). The other fiber-optic receiver channels 1690B and 1690C include similar elements that are similarly numbered. Also included is a phase mask element 1661 of a transparent material, upper V-groove alignment element 704 and lower V-groove alignment element 705, and a light source 1680 provided by the end of a source optical fiber 1670. A dummy optical fiber 1630X is included in the assembly as a convenient and economical way to constrain other operating optical fibers in their proper positions.

The phase mask element 1661 is constructed similarly to the previously discussed phase mask element 1061 except the 3-phase configuration phase masks 1620A, 1620B, and 1620C are respectively located over the positions of the receiver channel apertures 1610A, 1610B, and 1610C, which are dictated by the V-groove 709 of the upper V-groove alignment element 704, and the V-grooves 707 and 708 of the lower V-groove alignment element 705, respectively. In various exemplary embodiments, the phase masks 1620A, 1620B, and 1620C have corresponding spatial phases of 0, 120, and 240 degrees, respectively.

Also shown in FIG. 10 is an assembly housing 700 comprising a rectangular ferrule 701. The rectangular ferrule 701 fits snugly over the upper V-groove alignment element 704 and lower V-groove alignment element 705 when they are abutted at their interface 706 and properly aligned and inserted into the rectangular hole through the rectangular ferrule 701. In one exemplary embodiment the V-groove alignment elements 704 and 705 are silicon V-groove alignment elements of the type commercially available and used for fiber-optic alignment in the telecommunications industry. The V-grooves 707-709 are fabricated such that when the upper V-groove alignment element 704 and lower V-groove alignment element 705 are properly aligned and constrained within the rectangular ferrule 701, the various operating optical fibers 1670 and 1630A-C positioned within the upper and lower V-groove alignment element 704 and 705 are constrained in a close packing configuration.

In one exemplary assembly method, the fibers are inserted and aligned in the upper and lower V-groove alignment elements 704 and 705, which are then lightly compressed together at the interface 706 and inserted into the rectangular ferrule 701. The various fibers and the V-groove alignment elements 704 and 705 may be bonded to the ferrule 701 and to each other and polished flush with the front surfaces of the V-groove alignment elements 704 and 705. The phase mask element 1661 may be aligned to the fiber ends under a microscope and bonded to the front surfaces of the V-groove alignment elements 704 and 705 and/or the ferrule 701. In one exemplary embodiment, the phase masks 1620A-C are fabricated on the 'inside' of the phase mask element 1661, nearest the fiber ends. It will be appreciated that in a readhead according to this invention, the light source 1680 will be aligned with the source grating 85, and the fiber-optic receiver channels 1690 will be aligned with the interference field generating grating 95, the interference illumination zone 92, and the fringes 266, according to previously described principles. The fiber-optic spatial phase mask assembly 1000" may have overall width and height dimensions on the order of 3 millimeters, or 2 millimeters, or even less.

It will be appreciated that the fiber-optic spatial phase mask assembly 1000" is configured advantageously with respect to yaw considerations, as outlined previously. If necessary, a readhead employing the spatial phase mask assembly 1000" may be mounted or aligned with a slight "roll" such that the light that is reflectively diffracted from the scale grating falls directly on the receiver channels 1690A-1690C, despite the location of the light source 1680 at the side of the receiver channel configuration.

Figure 11:
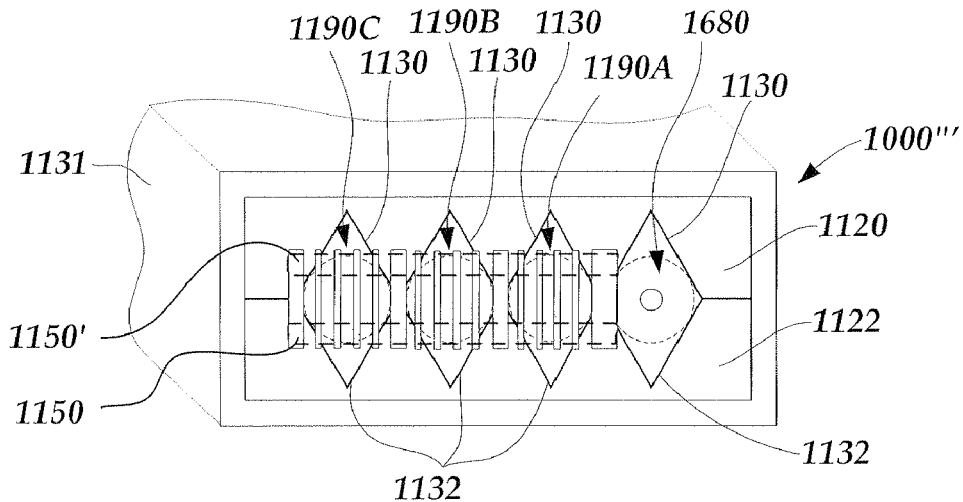
FIG. 11 shows a further embodiment of a fiber-optic readhead arrangement according to this invention.

FIG. 11 illustrates a spatial phase mask assembly 1000''', which is a further variation of the spatial phase mask assembly 1000" of FIG. 10 using V-groove alignment elements. Due to similarities in configuration and operation, only aspects of the fiber-optic spatial phase mask assembly 1000''' that require additional explanation are described below.

The fiber-optic spatial phase mask assembly 1000''' includes three fiber-optic receiver channels 1190A-1190C that provide a three phase system. The assembly 1000''' further includes a light source 1680 provided by the end of a source optical fiber 1670. Also included is an upper V-groove alignment element 1120 that includes an array of four V-grooves 1130, and a lower V-groove alignment element 1122 that includes an array of four V-grooves 1132. When assembled, the upper and lower V-groove alignment elements 1120 and 1122 form four diamond-shaped features for snugly receiving the source optical fiber 1680 and the three receiver optical fibers of the receiver channels 1190A-1190C. The spatial phase mask assembly 1000''' may be enclosed in a housing 1131.

It will be appreciated that the fiber-optic spatial phase mask assembly 1000''' is also configured advantageously with respect to yaw considerations. To make the spatial phase mask assembly 1000''' even less sensitive to yaw, in various embodiments, the rectangular regions 1150 and 1150' indicated by dashed outline may include mask elements that block light. In effect, this makes the receiver channel arrangement narrower along the direction perpendicular to the measuring axis direction. If necessary, a readhead employing the spatial phase mask assembly 1000''' may be mounted or aligned with a slight "pitch" such that the light that is reflectively diffracted from the scale grating falls directly on the receiver channels 1190A-1190C, despite the location of the light source 1680 at the end of the receiver channel configuration.

Figure 12A:
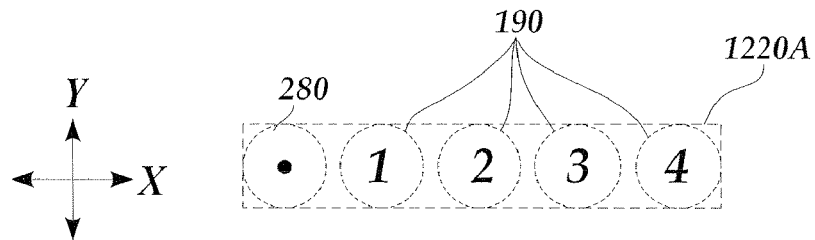
FIG. 12A schematically illustrates additional fiber-optic arrangements according to this invention.
Figure 12B:
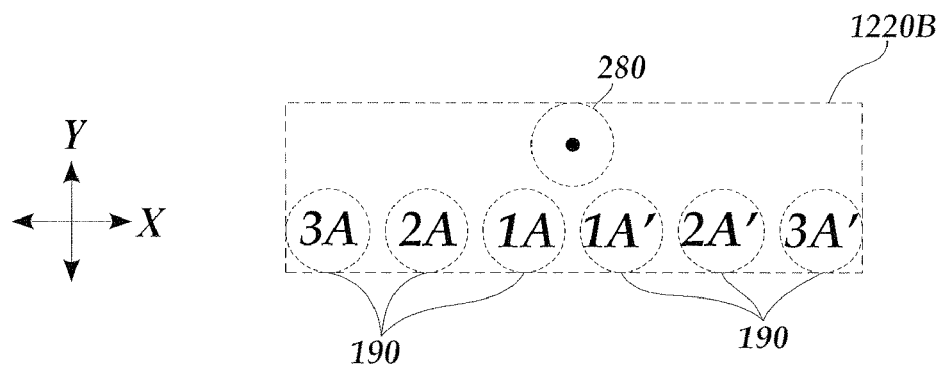
FIG. 12B schematically illustrates additional fiber-optic arrangements according to this invention.
Figure 12C:
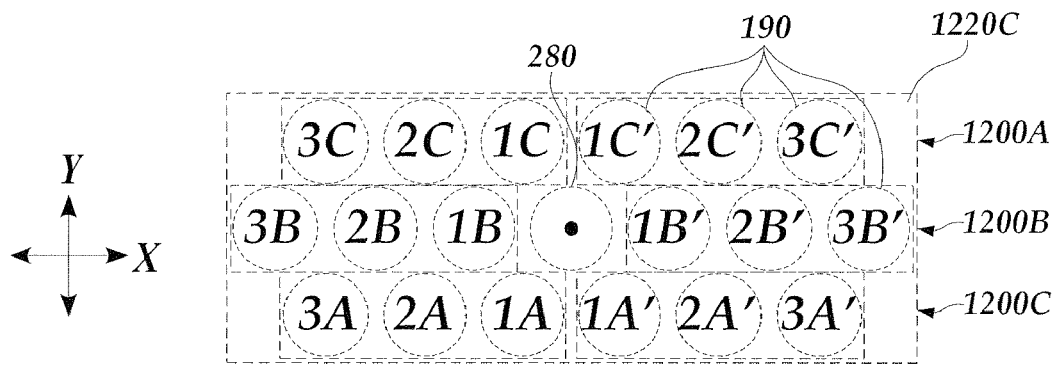
FIG. 12C schematically illustrates additional fiber-optic arrangements according to this invention.

FIGS. 12A-12C schematically illustrate various alternative configurations of receiver channels 190 and fiber-optic light sources 280 that may be used in various corresponding spatial phase mask assemblies. For each respective configuration, a respective spatial phase mask 1220 (A, B, or C) is positioned to provide the various receiver channels 190 with the various spatial phases represented by the numerals 1-3. For each configuration, the receiver channels 190 that have the same spatial phase may have their output signals summed. It will be appreciated that when these various configurations are used in various readheads according to this invention, the light source 280 will be aligned with the source grating 85, and the fiber-optic receiver channels 190 will be aligned with the interference field generating grating 95, the interference illumination zone 92, and the fringes 266, according to previously described principles.

FIG. 12A illustrates a linear arrangement 1220A of fiber-optic receiver channels 190 provided in line with a light-source channel 280. The receiver channels 190, numbered 1 through 4, respectively, may have relative spatial phases of 0, 90, 180, and 270 degrees respectively. That is, receiver channels 1 and 3 may be a complementary pair and receiver channels 1 and 4 may be a complementary pair. The resulting signal may be processed as previously described to provide two quadrature signals, which may in turn be processed to determine displacement according to known techniques.

FIG. 12B illustrates a linear arrangement 1220B of two sets of three fiber-optic receiver channels 190, which are arranged symmetrically adjacent to a light-source channel 280. In FIG. 12B the spatial phase difference between phases 1, 2, and 3 (or 1', 2', and 3') is 120 degrees. FIG. 12C illustrates an arrangement 1220C including three rows 1200A-C, each having two sets of three fiber-optic receiver channels 190. Each row includes two sets (3-2-1 and 1-2-3) that are arranged symmetrically relative to a light-source 280. In one embodiment, the signals from the each respective set may be processed such that each set provides an independent calculation of position/displacement, if desired. Next, the displacement results from the two sets in each row may be averaged. The resulting three displacement values may then be used to indicate the amount of readhead yaw (rotation about the Z axis) relative to the scale grating, and/or averaged to provide a "final" displacement value, if desired. Thus, the use of as many as three rows of fiber-optic receiver channels, each capable of independently determining position/displacement, may add robustness to the overall readhead position measurement. It should be appreciated that when the scale grating 80 has a very fine pitch, on the order of 0.6 or 0.4 microns, or less, for example, a very small amount of yaw misalignment may render the readhead inaccurate or inoperable. For an operable row of fiber-optic receiver channels aligned along the X direction (the measuring axis direction), the error produced for a given yaw rotation is less than for an operable row of fiber-optic receiver channels that are not aligned along the X direction. In an alternative embodiment, the "primed" sets of receiver channels could be eliminated, and the three rows of "unprimed" receiver channels can still be used to provide three independent displacement values, which may then be used as indicated above.

The foregoing examples show that various arrangements of fiber-optic receiver channels and a light-source channel are possible in accordance with the present invention. For example, the arrangement may include a single set of fiber-optic receiver channels, as in FIGS. 10 and 11, or may include a complementary-pair set of fiber-optic receiver channels, as in FIG. 12A, or balanced sets of fiber-optic receiver channels as in FIGS. 12B and 12C. Further, a plurality of balanced sets may be provided as shown in FIG. 12C. In accordance with various exemplary embodiments of the present invention, these fiber-optic receiver channels and light-source channel(s) are tightly compacted, as described above, so that their aggregate cross section can be enclosed within a dimension along the X direction of 250, 500, 750, 1000, or 1250 microns, and a dimension along the Y direction of 50, 100, 125, 200, or 250 um, in various combinations, depending on the number of included optical fibers and their configuration.

Figure 13:
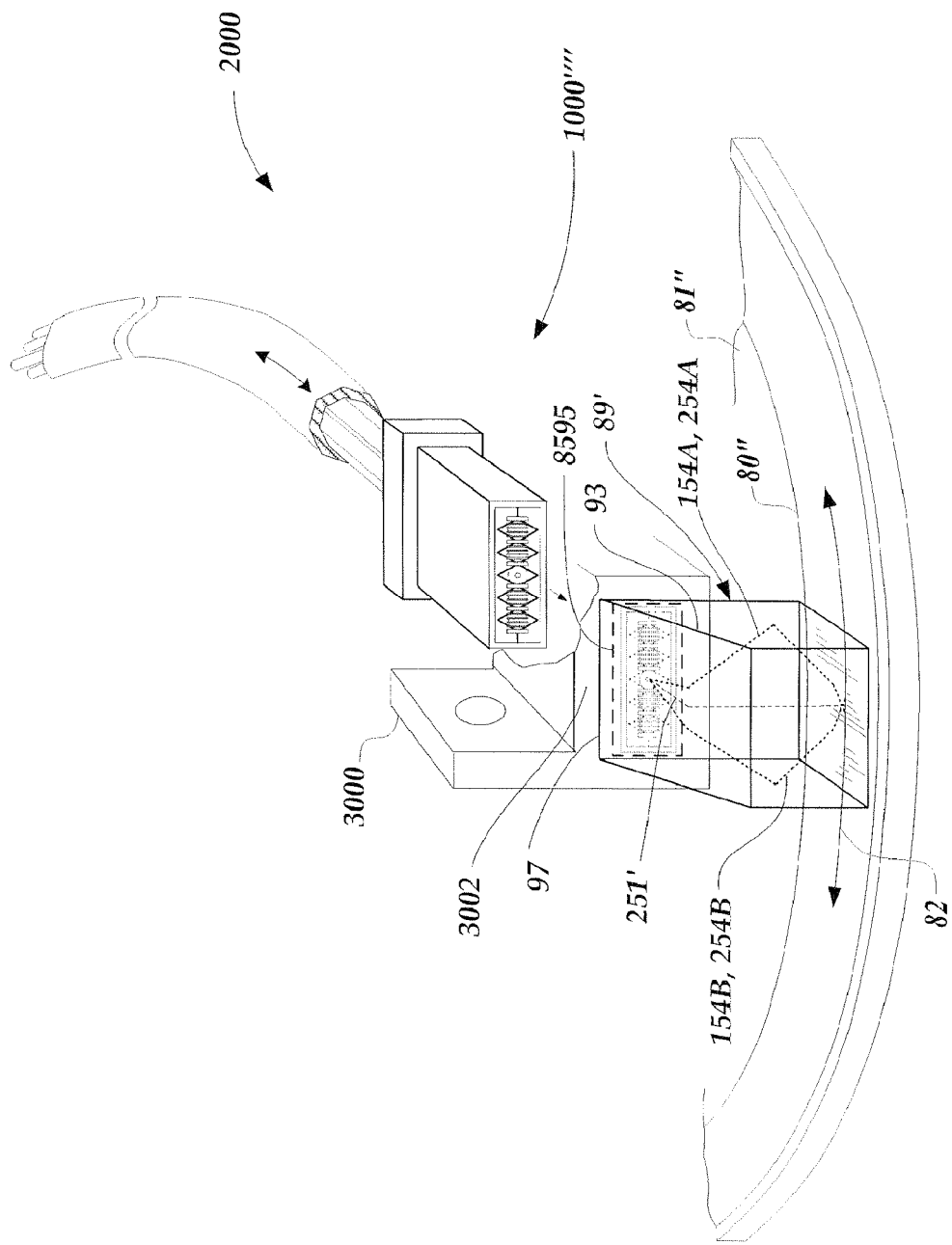
FIG. 13 illustrates an exploded view of a fiber-optic readhead arrangement according to this invention that includes deflected optical paths.

FIG. 13 illustrates an exploded view of a fiber-optic readhead 2000 that is implemented according to the principles of this invention. In contrast to previously illustrated embodiments, the fiber-optic readhead 2000 includes a "deflected" optical path, as described below. The readhead 2000 includes a spatial phase mask assembly 1000'''', which in one embodiment may be similar or identical to the spatial phase mask assembly 1000''' described with reference to FIG. 11, and an optical block 89' that is designed according to principles previously described with reference to FIG. 5B. In general, except for the deflected optical paths, the design and operation of the readhead 2000 may be understood based on the description of the design and operation of the readhead 200' shown in FIGS. 5A and 5B. Thus, only certain differences and important features will be described here.

In particular the optical block 89' includes an angled mirrored surface 93 arranged relative to the optical block 89' in approximately the same position indicated by the dashed line 93' relative to the optical block 89 shown in FIG. 5B. Grating elements that function in the same manner as the elements 105, 85, 95, previously described with reference to FIGS. 5A and 5B, are arranged on the upper rear face 97 of the optical block 89', in the grating region 8595, generally indicated with a dashed outline. In the embodiment shown in FIG. 13, the grooves of the grating elements would be aligned vertically. The plane of the surface 93 may be oriented at a 45-degree angle relative to the plane of the upper rear face 97.

In one embodiment, the spatial phase mask assembly 1000'''' may be inserted through a hole located in a mounting bracket 3000, as indicated in FIG. 13, until it abuts the grating region 8595. The optical block 89' and/or the periphery of the grating region 8595 may be bonded to a front surface 3002 of the mounting block 3000, if desired, and the spatial phase mask assembly 1000'''' may be properly aligned with the gratings in the grating region 8595, and bonded in place. The gratings in the grating region 8595 may be aligned relative to the light source and the receiver channels of the spatial phase mask assembly 1000'''' according to previously described principles. It will be understood that the mounting bracket 3000 is not an essential feature, and the spatial phase mask assembly 1000'''' may be fixed directly to the optical block 89' and/or the grating region 8595, in various embodiments.

In operation, the source light from the light source of the spatial phase mask assembly 1000'''' will initially be aligned along the source light axis 251'. In FIG. 13, a reference line is extended from the source light axis and "deflected" at the surface 93, simply as an aid in visualizing the operation and orientation of the surface 93. It will be understood that little or no light is projected past the source grating along the source light axis 251', in various embodiments. At the source grating in the grating region 8595, $+/- 1^{st}$ order light beams 154A and 154B are generated, as previously described herein. The light beams 154A and 154B continue toward the surface 93, and are deflected down and toward the sides of the optical block 89', where they are reflected to converge toward the scale grating 80" provided on, or in, a substrate 81", as shown. The beams are reflectively diffracted from the scale grating 80" as light beams 254A and 254B, and return along approximately the same path, according to previously described principles. It will be appreciated that only the central rays of the various light beams are illustrated in FIG. 13. However, each of the beams comprises slightly diverging rays, in order to provide a field of interference fringes that covers all of the optical receiver channel apertures of the spatial phase mask assembly 1000'''', according to previously described principles. Other aspects of the design and operation of the readhead 2000 will be understood by analogy with previous descriptions.

The scale grating 80" shown in FIG. 13 forms a portion of a circular rotary encoder, and moves relative to the optical fiber readhead 2000 along the circular measuring axis direction 82.

It should be appreciated that the configuration of the readhead 2000 is not limited to use with rotary scale grating configurations. It is also usable in conjunction with other scale grating configuration shown or described herein, or that is otherwise compatible with this invention.

It should be appreciated that the curvature of the rotary scale grating 80" may slightly disturb the accuracy of the interference fringes arising from the rotary scale grating 80", and therefore degrade the measuring accuracy to some extent. However, it should be further appreciated that in various exemplary embodiments, the illumination spot on the rotary scale grating 80" may be quite small, and the resulting interference fringes are still adequate for many practical applications. In particular, in various exemplary embodiments a rotary scale grating 80" having a small grating pitch, for example, on the order of 1.0 micron, or less, and having a diameter of approximately 25 mm or more, can provide measurement performance comparable to a similar straight scale grating when used with an optical fiber readhead according to this invention. The rotary scale grating 80" may be use in conjunction with the configuration of the readhead 2000 as shown or, more generally, as a substitute for any straight scale grating 80 usable with any other embodiment of an optical fiber readhead shown or described herein.

While this invention has been described in conjunction with the exemplary embodiments outlined above, it is evident that the embodiments and design factors described above are indicative of additional alternative embodiments, modifications and variations, as will be apparent to those skilled in the art. Accordingly, the embodiments of the invention, as set forth above, are intended to be illustrative, not limiting. Various changes may be made without departing from the spirit and scope of the invention.

The invention claimed is:

1. A device for measuring the relative displacement between two members, the device comprising:
   (1) a scale having a scale grating pattern formed along a measuring axis direction; and
   (2) a fiber-optic readhead positionable relative to the scale grating pattern to provide a set of interference fringes that has a fringe pitch $P_{if}$, the set of interference fringes moving relative to the fiber-optic readhead when the fiber-optic readhead moves relative to the scale along the measuring axis direction, the fiber-optic readhead comprising:
      (a) a light source having a numerical aperture NA that provides a diverging coherent light beam;
      (b) a source grating that inputs the diverging coherent light beam and outputs +1st and −1st order source light beams at a diffraction angle α, wherein each of the +1st and −1st order source light beams include diverging rays;
      (c) a pair of reflective surfaces that are arranged to reflect the +1st and −1st order source light beams along paths that converge toward the scale grating, and receive respective +1st and −1st order scale light beams diffracted back along respective paths from the scale grating pattern, and reflect the respective +1st and −1st order scale light beams to converge in an interference illumination field proximate to the source grating;
      (d) an interference field generating grating that receives the at least +1st and −1st order scale light beams in the interference illumination field at a first nominal angle and that outputs the same at a second nominal angle β to produce the set of interference fringes that has the fringe pitch $P_{if}$; and
      (e) a plurality of fiber-optic receiver channels arranged to input light from the set of interference fringes that has the fringe pitch $P_{if}$, each fiber-optic receiver channel comprising:
         (i) a receiver channel spatial phase mask portion having a spatial phase, the spatial phase mask portion having its light-blocking elements arranged at a pitch that is operable for spatially filtering the light of the set of interference fringes that has the fringe pitch $P_{if}$; and
         (ii) at least one receiver channel optical fiber having an input end that is positioned to receive spatially filtered light through the spatial phase mask portion from the set of interference fringes;

wherein:
   the light that produces the set of interference fringes that has the fringe pitch $P_{if}$ comprises interfering beams that each comprise the diverging rays, the diverging rays continuously diverging along their entire optical path within the +1st and −1st order source light beams;
   when the readhead is operably positioned relative to the scale grating pattern, at least first and second channels of the plurality of fiber-optic receiver channels spatially filter the light of the set of fringes to provide at least first and second receiver channel optical signals having at least first and second signal phases, respectively; and
   the device outputs the at least first and second receiver channel optical signals along respective optical fibers to provide relative displacement measurement information in the form of a plurality of optical output signals.

2. The device of claim 1, wherein the device is configured such that the light included in the +1st and −1st order source light beams that are reflected along the paths that converge toward the scale grating consists of light that is substantially s-polarized with respect to the scale grating.

3. The device of claim 2, wherein the scale grating has a pitch that is at most 1.5 microns.

4. The device of claim 1, wherein the scale grating has a pitch that is at most 2 microns, the readhead comprises an optical block, and the readhead is configured such that the light included in the +1st and −1st order source light beams that are reflected along the paths that converge toward the scale grating follows a path through the material of the optical block after it is reflected and emerges from a surface of the optical block prior to reaching the scale grating.

5. The device of claim 1, wherein the plurality of fiber-optic receiver channels have input apertures that are all arranged within a region that has a dimension along a direction perpendicular to the measuring axis direction that is at most 1.0 millimeter.

6. The device of claim 5, wherein the dimension along a direction perpendicular to the measuring axis direction that is at most 0.5 millimeters.

7. The device of claim 1, wherein the source grating is a phase grating configured to suppress zero order transmission.

8. The device of claim 1, wherein the interference field generating grating is a phase grating configured to suppress zero order transmission.

9. The device of claim 8, wherein the interference field generating grating surrounds the source grating.

10. The device of claim 9, wherein the light source is provided by light emitted from the end of an optical fiber.

11. The device of claim 1, wherein the light source is located adjacent to the plurality of fiber-optic receiver channels.

12. The device of claim 1, wherein the source grating is configured to input the diverging coherent light beam normal to the source grating.

13. The device of claim 1, wherein light and dark interference fringe zones of the set of interference fringes each extend nominally perpendicular to the measuring axis direction.

* * * * *

UNITED STATES PATENT AND TRADEMARK OFFICE
CERTIFICATE OF CORRECTION

PATENT NO. : 7,502,122 B2 Page 1 of 1
APPLICATION NO. : 11/461423
DATED : March 10, 2009
INVENTOR(S) : J. D. Tobiason et al.

It is certified that error appears in the above-identified patent and that said Letters Patent is hereby corrected as shown below:

| COLUMN | LINE | ERROR |
|---|---|---|
| 24 (Claim 6, line 2) | 41 | after "axis direction" delete "that" |

Signed and Sealed this

Sixteenth Day of March, 2010

David J. Kappos
*Director of the United States Patent and Trademark Office*